(12) United States Patent
Shokrollahi et al.

(10) Patent No.: US 10,374,846 B2
(45) Date of Patent: Aug. 6, 2019

(54) CLOCK-EMBEDDED VECTOR SIGNALING CODES

(71) Applicant: Kandou Labs, S.A., Lausanne (CH)

(72) Inventors: Amin Shokrollahi, Préverenges (CH);
Brian Holden, Monte Sereno, CA (US);
Richard Simpson, Bedford (GB)

(73) Assignee: KANDOU LABS, S.A., Lausanne (CH)

( * ) Notice: Subject to any disclaimer, the term of this patent is extended or adjusted under 35 U.S.C. 154(b) by 0 days.

(21) Appl. No.: 16/031,875

(22) Filed: Jul. 10, 2018

(65) Prior Publication Data

US 2018/0324008 A1   Nov. 8, 2018

Related U.S. Application Data

(63) Continuation of application No. 15/390,293, filed on Dec. 23, 2016, now Pat. No. 10,020,966, which is a
(Continued)

(51) Int. Cl.
*H04L 25/00*     (2006.01)
*H04L 25/49*     (2006.01)
(Continued)

(52) U.S. Cl.
CPC ........ *H04L 25/49* (2013.01); *H04L 25/03006* (2013.01); *H04L 25/03057* (2013.01); *H04L 25/08* (2013.01); *H04L 25/085* (2013.01)

(58) Field of Classification Search
CPC . H04L 25/49; H04L 25/085; H04L 25/03057; H04L 25/03006; H04L 25/08
See application file for complete search history.

(56) References Cited

U.S. PATENT DOCUMENTS 3,196,351 A    7/1965  David
3,970,795 A    7/1976  Allen
(Continued)

FOREIGN PATENT DOCUMENTS

CN    1864346 A    11/2006
CN    101276645 A   10/2008
(Continued)

OTHER PUBLICATIONS

Abbasfar, Aliazam , "Generalized Differential Vector Signaling", IEEE International Conference on Communications, ICC '09, Jun. 14, 2009, 1-5 (5 pages).
(Continued)

*Primary Examiner* — Dac V Ha
(74) *Attorney, Agent, or Firm* — Invention Mine LLC

(57) ABSTRACT

Vector signaling codes providing guaranteed numbers of transitions per unit transmission interval are described, along with methods and systems for their generation and use. The described architecture may include multiple communications sub-systems, each having its own communications wire group or sub-channel, clock-embedded signaling code, pre- and post-processing stages to guarantee the desired code transition density, and global encoding and decoding stages to first distribute data elements among the sub-systems, and then to reconstitute the received data from its received sub-system elements.

20 Claims, 25 Drawing Sheets

Related U.S. Application Data continuation of application No. 15/176,085, filed on Jun. 7, 2016, now Pat. No. 9,686,106, which is a continuation of application No. 14/636,098, filed on Mar. 2, 2015, now Pat. No. 9,363,114.

(60) Provisional application No. 61/946,574, filed on Feb. 28, 2014.

(51) Int. Cl.
*H04L 25/03* (2006.01)
*H04L 25/08* (2006.01)

(56) References Cited

U.S. PATENT DOCUMENTS

| | | |
|---|---|---|
| 4,163,258 A | 7/1979 | Ebihara et al. |
| 4,499,550 A | 2/1985 | Ray et al. |
| 4,722,084 A | 1/1988 | Morton |
| 4,974,211 A | 11/1990 | Corl |
| 5,053,974 A | 10/1991 | Penz |
| 5,166,956 A | 11/1992 | Baltus et al. |
| 5,283,761 A | 2/1994 | Gillingham |
| 5,287,305 A | 2/1994 | Yoshida |
| 5,311,516 A | 5/1994 | Kuznicki et al. |
| 5,331,320 A | 7/1994 | Cideciyan et al. |
| 5,412,689 A | 5/1995 | Chan et al. |
| 5,449,895 A | 9/1995 | Hecht et al. |
| 5,461,379 A | 10/1995 | Weinman |
| 5,511,119 A | 4/1996 | Lechleider |
| 5,553,097 A | 9/1996 | Dagher |
| 5,689,509 A | 11/1997 | Gaytan et al. |
| 5,856,935 A | 1/1999 | Moy et al. |
| 5,889,981 A | 3/1999 | Betker et al. |
| 5,949,060 A | 9/1999 | Schattschneider et al. |
| 5,982,954 A | 11/1999 | Delen et al. |
| 5,995,016 A | 11/1999 | Perino |
| 6,005,895 A | 12/1999 | Perino et al. |
| 6,084,883 A | 7/2000 | Norrell et al. |
| 6,084,958 A | 7/2000 | Blossom |
| 6,097,732 A | 8/2000 | Jung |
| 6,154,498 A | 11/2000 | Dabral et al. |
| 6,242,321 B1 | 6/2001 | Acosta et al. |
| 6,278,740 B1 | 8/2001 | Nordyke |
| 6,317,465 B1 | 11/2001 | Akamatsu et al. |
| 6,359,931 B1 | 3/2002 | Perino et al. |
| 6,378,073 B1 | 4/2002 | Davis et al. |
| 6,404,820 B1 | 6/2002 | Postol |
| 6,452,420 B1 | 9/2002 | Wong |
| 6,483,828 B1 | 11/2002 | Balachandran et al. |
| 6,504,875 B2 | 1/2003 | Perino et al. |
| 6,556,628 B1 | 4/2003 | Poulton et al. |
| 6,621,427 B2 | 9/2003 | Greenstreet |
| 6,621,945 B2 | 9/2003 | Bissessur |
| 6,650,638 B1 | 11/2003 | Walker et al. |
| 6,661,355 B2 | 12/2003 | Cornelius et al. |
| 6,766,342 B2 | 7/2004 | Kechriotis |
| 6,865,234 B1 | 3/2005 | Agazzi |
| 6,865,236 B1 | 3/2005 | Terry |
| 6,876,317 B2 | 4/2005 | Sankaran |
| 6,898,724 B2 | 5/2005 | Chang |
| 6,927,709 B2 | 8/2005 | Kiehl |
| 6,954,492 B1 | 10/2005 | Williams |
| 6,976,194 B2 | 12/2005 | Cypher |
| 6,982,954 B2 | 1/2006 | Dhong et al. |
| 6,990,138 B2 | 1/2006 | Bejjani et al. |
| 6,999,516 B1 | 2/2006 | Rajan |
| 7,023,817 B2 | 4/2006 | Kuffner et al. |
| 7,038,486 B2 | 5/2006 | Aoyama et al. |
| 7,039,136 B2 | 5/2006 | Olson et al. |
| 7,053,802 B2 | 5/2006 | Cornelius |
| 7,075,996 B2 | 7/2006 | Simon et al. |
| 7,085,153 B2 | 8/2006 | Ferrant et al. |
| 7,127,003 B2 | 10/2006 | Rajan et al. |
| 7,142,612 B2 | 11/2006 | Horowitz et al. |
| 7,167,019 B2 | 1/2007 | Broyde et al. |
| 7,180,949 B2 | 2/2007 | Kleveland et al. |
| 7,184,483 B2 | 2/2007 | Rajan |
| 7,269,212 B1 | 9/2007 | Chau et al. |
| 7,356,213 B1 | 4/2008 | Cunningham et al. |
| 7,358,869 B1 | 4/2008 | Chiarulli et al. |
| 7,389,333 B2 | 6/2008 | Moore et al. |
| 7,400,276 B1 | 7/2008 | Sotiriadis et al. |
| 7,535,957 B2 | 5/2009 | Ozawa et al. |
| 7,583,209 B1 | 9/2009 | Duan |
| 7,613,234 B2 | 11/2009 | Raghavan et al. |
| 7,620,116 B2 | 11/2009 | Bessios et al. |
| 7,633,850 B2 | 12/2009 | Ahn |
| 7,656,321 B2 | 2/2010 | Wang |
| 7,706,456 B2 | 4/2010 | Laroia et al. |
| 7,706,524 B2 | 4/2010 | Zerbe |
| 7,746,764 B2 | 6/2010 | Rawlins et al. |
| 7,808,456 B2 | 10/2010 | Chen et al. |
| 7,808,830 B2 | 10/2010 | Kasuta |
| 7,841,909 B2 | 11/2010 | Murray et al. |
| 7,868,790 B2 | 1/2011 | Bae |
| 7,869,546 B2 | 1/2011 | Tsai |
| 7,899,653 B2 | 3/2011 | Hollis |
| 8,050,332 B2 | 11/2011 | Chung et al. |
| 8,055,095 B2 | 11/2011 | Palotai et al. |
| 8,064,535 B2 | 11/2011 | Wiley |
| 8,085,172 B2 | 12/2011 | Li et al. |
| 8,149,906 B2 | 4/2012 | Saito et al. |
| 8,159,375 B2 | 4/2012 | Abbasfar |
| 8,159,376 B2 | 4/2012 | Abbasfar |
| 8,180,931 B2 | 5/2012 | Lee et al. |
| 8,199,849 B2 | 6/2012 | Oh et al. |
| 8,199,863 B2 | 6/2012 | Chen et al. |
| 8,209,580 B1 * | 6/2012 | Varnica ............... H03M 13/033 714/752 |
| 8,218,670 B2 | 7/2012 | Abou |
| 8,245,094 B2 | 8/2012 | Jiang et al. |
| 8,274,311 B2 | 9/2012 | Liu |
| 8,279,094 B2 | 10/2012 | Abbasfar |
| 8,279,745 B2 | 10/2012 | Dent |
| 8,279,976 B2 | 10/2012 | Lin et al. |
| 8,284,848 B2 | 10/2012 | Nam et al. |
| 8,289,914 B2 | 10/2012 | Li et al. |
| 8,295,250 B2 | 10/2012 | Gorokhov et al. |
| 8,359,445 B2 | 1/2013 | Perego et al. |
| 8,365,035 B2 | 1/2013 | Nara |
| 8,406,315 B2 | 3/2013 | Tsai |
| 8,437,440 B1 | 5/2013 | Zhang et al. |
| 8,442,099 B1 | 5/2013 | Sederat |
| 8,442,210 B2 | 5/2013 | Zerbe |
| 8,451,913 B2 | 5/2013 | Oh et al. |
| 8,472,513 B2 | 6/2013 | Malipatil et al. |
| 8,498,344 B2 | 7/2013 | Wilson et al. |
| 8,498,368 B1 | 7/2013 | Husted et al. |
| 8,520,493 B2 | 8/2013 | Goulahsen |
| 8,539,318 B2 | 9/2013 | Shokrollahi et al. |
| 8,577,284 B2 | 11/2013 | Seo et al. |
| 8,578,246 B2 | 11/2013 | Mittelholzer et al. |
| 8,588,254 B2 | 11/2013 | Diab et al. |
| 8,588,280 B2 | 11/2013 | Oh et al. |
| 8,593,305 B1 | 11/2013 | Tajalli et al. |
| 8,620,166 B2 | 12/2013 | Guha |
| 8,638,241 B2 | 1/2014 | Sudhakaran et al. |
| 8,649,445 B2 | 2/2014 | Cronie et al. |
| 8,649,460 B2 | 2/2014 | Ware et al. |
| 8,687,968 B2 | 4/2014 | Nosaka et al. |
| 8,718,184 B1 | 5/2014 | Cronie et al. |
| 8,755,426 B1 | 6/2014 | Cronie et al. |
| 8,773,964 B2 | 7/2014 | Hsueh et al. |
| 8,780,687 B2 | 7/2014 | Clausen et al. |
| 8,831,440 B2 | 9/2014 | Yu et al. |
| 8,879,660 B1 | 11/2014 | Peng et al. |
| 8,897,134 B2 | 11/2014 | Kern et al. |
| 8,938,171 B2 | 1/2015 | Tang et al. |
| 8,949,693 B2 | 2/2015 | Ordentlich et al. |
| 8,951,072 B2 | 2/2015 | Hashim et al. |
| 8,989,317 B1 | 3/2015 | Holden et al. |
| 8,996,740 B2 | 3/2015 | Wiley et al. |
| 9,015,566 B2 | 4/2015 | Cronie et al. |

(56) References Cited

U.S. PATENT DOCUMENTS

| | | |
|---|---|---|
| 9,071,476 B2 | 6/2015 | Fox et al. |
| 9,077,386 B1 | 7/2015 | Holden et al. |
| 9,093,791 B2 | 7/2015 | Liang |
| 9,100,232 B1 | 8/2015 | Hormati et al. |
| 9,124,557 B2 | 9/2015 | Fox et al. |
| 9,165,615 B2 | 10/2015 | Amirkhany et al. |
| 9,197,470 B2 | 11/2015 | Okunev |
| 9,231,790 B2 | 1/2016 | Wiley et al. |
| 9,246,713 B2 | 1/2016 | Shokrollahi |
| 9,251,873 B1 | 2/2016 | Fox et al. |
| 9,288,082 B1 | 3/2016 | Ulrich et al. |
| 9,288,089 B2 | 3/2016 | Cronie et al. |
| 9,331,962 B2 | 5/2016 | Lida et al. |
| 9,362,974 B2 | 6/2016 | Fox et al. |
| 9,363,114 B2 | 6/2016 | Shokrollahi et al. |
| 9,401,828 B2 | 7/2016 | Cronie et al. |
| 9,432,082 B2 | 8/2016 | Ulrich et al. |
| 9,432,298 B1 | 8/2016 | Smith |
| 9,455,765 B2 | 9/2016 | Schumacher et al. |
| 9,461,862 B2 | 10/2016 | Holden et al. |
| 9,479,369 B1 | 10/2016 | Shokrollahi |
| 9,509,437 B2 | 11/2016 | Shokrollahi |
| 9,537,644 B2 | 1/2017 | Jones et al. |
| 9,634,797 B2 | 4/2017 | Benammar et al. |
| 9,667,379 B2 | 5/2017 | Cronie et al. |
| 9,710,412 B2 | 7/2017 | Sengoku |
| 10,055,372 B2 | 8/2018 | Shokrollahi |
| 2001/0006538 A1 | 7/2001 | Simon et al. |
| 2002/0044316 A1 | 4/2002 | Myers |
| 2002/0057592 A1 | 5/2002 | Robb |
| 2002/0152340 A1 | 10/2002 | Dreps et al. |
| 2002/0154633 A1 | 10/2002 | Shin et al. |
| 2002/0174373 A1 | 11/2002 | Chang |
| 2002/0181607 A1 | 12/2002 | Izumi |
| 2003/0086366 A1 | 5/2003 | Branlund et al. |
| 2003/0117184 A1 | 6/2003 | Fecteau et al. |
| 2004/0057525 A1 | 3/2004 | Rajan et al. |
| 2004/0146117 A1 | 7/2004 | Subramaniam et al. |
| 2004/0155802 A1 | 8/2004 | Lamy et al. |
| 2004/0161019 A1 | 8/2004 | Raghavan et al. |
| 2004/0169529 A1 | 9/2004 | Afghani et al. |
| 2004/0170231 A1 | 9/2004 | Bessios et al. |
| 2004/0239374 A1 | 12/2004 | Hori |
| 2005/0027876 A1 | 2/2005 | Umei et al. |
| 2005/0174841 A1 | 8/2005 | Ho |
| 2005/0213686 A1 | 9/2005 | Love et al. |
| 2006/0013331 A1 | 1/2006 | Choi et al. |
| 2006/0126751 A1 | 6/2006 | Bessios |
| 2006/0159005 A1 | 7/2006 | Rawlins et al. |
| 2006/0236174 A1 | 10/2006 | Whetsel |
| 2006/0291589 A1 | 12/2006 | Eliezer et al. |
| 2007/0030796 A1 | 2/2007 | Green |
| 2007/0164883 A1 | 7/2007 | Furtner |
| 2007/0263711 A1 | 11/2007 | Theodor et al. |
| 2008/0013622 A1 | 1/2008 | Bao et al. |
| 2008/0104374 A1 | 5/2008 | Mohamed |
| 2008/0159448 A1 | 7/2008 | Anim-Appiah et al. |
| 2008/0192621 A1 | 8/2008 | Suehiro |
| 2008/0316070 A1 | 12/2008 | Van et al. |
| 2009/0046009 A1 | 2/2009 | Fujii |
| 2009/0059782 A1 | 3/2009 | Cole |
| 2009/0112551 A1 | 4/2009 | Hollis |
| 2009/0154604 A1 | 6/2009 | Lee |
| 2009/0195281 A1 | 8/2009 | Tamura et al. |
| 2010/0046644 A1 | 2/2010 | Mazet |
| 2010/0081451 A1 | 4/2010 | Mueck et al. |
| 2010/0122021 A1 | 5/2010 | Lee et al. |
| 2010/0215112 A1 | 8/2010 | Tsai et al. |
| 2010/0215118 A1 | 8/2010 | Ware et al. |
| 2010/0235673 A1 | 9/2010 | Abbasfar |
| 2010/0296556 A1 | 11/2010 | Rave et al. |
| 2010/0309964 A1 | 12/2010 | Oh et al. |
| 2011/0014865 A1 | 1/2011 | Seo et al. |
| 2011/0072244 A1 | 3/2011 | Lindholm et al. |
| 2011/0084737 A1 | 4/2011 | Oh et al. |
| 2011/0127990 A1 | 6/2011 | Wilson et al. |
| 2011/0235501 A1 | 9/2011 | Goulahsen |
| 2011/0268225 A1 | 11/2011 | Cronie et al. |
| 2011/0286497 A1 | 11/2011 | Nervig |
| 2011/0299555 A1 | 12/2011 | Cronie et al. |
| 2011/0302478 A1 | 12/2011 | Cronie et al. |
| 2011/0317559 A1 | 12/2011 | Kern et al. |
| 2012/0082242 A1* | 4/2012 | Narroschke .......... H04N 19/423 375/240.25 |
| 2012/0213299 A1 | 8/2012 | Cronie et al. |
| 2012/0243589 A1 | 9/2012 | Desjardins |
| 2013/0010892 A1 | 1/2013 | Cronie et al. |
| 2013/0013870 A1 | 1/2013 | Cronie et al. |
| 2013/0114392 A1 | 5/2013 | Sun et al. |
| 2013/0159584 A1 | 6/2013 | Nygren et al. |
| 2013/0188656 A1 | 7/2013 | Ferraiolo et al. |
| 2013/0259113 A1 | 10/2013 | Kumar |
| 2013/0346830 A1 | 12/2013 | Ordentlich et al. |
| 2014/0177645 A1 | 6/2014 | Cronie et al. |
| 2014/0198841 A1 | 7/2014 | George et al. |
| 2014/0254642 A1 | 9/2014 | Fox et al. |
| 2014/0269130 A1 | 9/2014 | Maeng et al. |
| 2015/0063494 A1 | 3/2015 | Simpson et al. |
| 2015/0078479 A1 | 3/2015 | Whitby-Strevens |
| 2015/0092532 A1 | 4/2015 | Shokrollahi et al. |
| 2015/0222458 A1 | 8/2015 | Hormati et al. |
| 2015/0236885 A1 | 8/2015 | Ling et al. |
| 2015/0249559 A1 | 9/2015 | Shokrollahi et al. |
| 2015/0333940 A1 | 11/2015 | Shokrollahi |
| 2015/0349835 A1 | 12/2015 | Fox et al. |
| 2015/0380087 A1 | 12/2015 | Mittelholzer et al. |
| 2015/0381768 A1 | 12/2015 | Fox et al. |
| 2016/0020824 A1 | 1/2016 | Ulrich et al. |
| 2016/0036616 A1 | 2/2016 | Holden et al. |
| 2016/0218894 A1 | 7/2016 | Fox et al. |
| 2016/0380787 A1 | 12/2016 | Hormati et al. |
| 2017/0272285 A1 | 9/2017 | Shokrollahi et al. |

FOREIGN PATENT DOCUMENTS

| | | |
|---|---|---|
| CN | 101854223 A | 10/2010 |
| CN | 101999116 A | 3/2011 |
| CN | 102254571 B | 6/2015 |
| EP | 2039221 B1 | 2/2013 |
| JP | 2003163612 A | 6/2003 |
| WO | 2009084121 A1 | 7/2009 |
| WO | 2010031824 A1 | 3/2010 |
| WO | 2011119359 A2 | 9/2011 |
| WO | 2011153000 A2 | 12/2011 |

OTHER PUBLICATIONS

Anonymous, "Constant-weight code", Wikipedia.org, retrieved on Feb. 6, 2017, (3 pages).

Brown, L., et al., "V.92: The Last Dial-Up Modem?", IEEE Transactions on Communications, IEEE Service Center, Piscataway, NJ. USA, vol. 52, No. 1, Jan. 1, 2004, 54-61 (8 pages).

Cheng, Wei-Chung, et al., "Memory Bus Encoding for Low Power: A Tutorial", Proceedings of the IEEE 2001. 2nd International Symposium on Quality Electronic Design, Mar. 28, 2001, 199-204 (6 pages).

Counts, Lew, et al., "One-Chip "Slide Rule" Works with Logs, Antilogs for Real-Time Processing", Analog Devices, Computational Products 6, Reprinted from Electronic Design, May 2, 1985, 3-9 (7 pages).

Dasilva, Victor, et al., "Multicarrier Orthogonal Cdma Signals for Quasi-Synchronous Communication Systems", IEEE Journal on Selected Areas in Communications, vol. 12, No. 5, Jun. 1994, 842-852 (11 pages).

Elmhurst, Daniel, et al., "A 1.8 128-Mb 125-MHz Multi-level Cell Flash Memory With Flexible Read While Write", IEEE Journal of Solid-State Circuits, vol. 38, No. 11, Nov. 2003, 1929-1933 (5 pages).

Farzan, Kamran, et al., "Coding Schemes for Chip-to-Chip Interconnect Applications", IEEE Transactions on Very Large Scale Integration (VLSI) Systems, vol. 14, No. 4, Apr. 2006, 393-406 (14 pages).

(56) References Cited

OTHER PUBLICATIONS

Giovaneli, Carlos Lopez, et al., "Space-Frequency Coded OFDM System for Multi-Wire Power Line Communications", Power Line Communications and Its Applications, 2005 International Symposium on Vancouver, BC, Canada, IEEE XP-002433844, Apr. 6-8, 2005, 191-195 (5 pages).

Healey, Adam, et al., "A Comparison of 25 Gbps NRZ & PAM-4 Modulation used in Legacy & Premium Backplane Channels", Tyco Electronics Corporation, DesignCon 2012, Jan. 2012, 1-16 (16 pages).

Holden, Brian, "An exploration of the technical feasibility of the major technology options for 400GE backplanes", IEEE 802.3 400GE Study Group, Geneva, CH, Jul. 16, 2013, 1-18 (18 pages).

Holden, Brian, "Simulation results for NRZ, ENRZ & PAM-4 on 16-wire full-sized 400GE backplanes", IEEE 802.3 400GE Study Group, York, UK, Sep. 2, 2013, 1-19 (19 pages).

Holden, Brian, "Using Ensemble NRZ Coding for 400GE Electrical Interfaces", IEEE 802.3 400GE Study Group, May 17, 2013, 1-24 (24 pages).

Jiang, Anxiao, et al., "Rank Modulation for Flash Memories", IEEE Transactions of Information Theory, vol. 55, No. 6, Jun. 2009, 2659-2673 (16 pages).

Oh, Dan, et al., "Pseudo-Differential Vector Signaling for Noise Reduction in Single-Ended Signaling Systems", DesignCon 2009, Rambus Inc., Jan. 2009, (22 pages).

Poulton, John, "Multiwire Differential Signaling", UNC-CH Department of Computer Science Version 1.1, Aug. 6, 2003, 1-20 (20 pages).

She, James, et al., "A Framework of Cross-Layer Superposition Coded Multicast for Robust IPTV Services over WiMAX", IEEE Wireless Communications and Networking Conference, Apr. 15, 2008, 3139-3144 (6 pages).

Skliar, Osvaldo, et al., "A Method for the Analysis of Signals: the Square-Wave Method", Revista de Matematica Teoria y Aplicationes, vol. 15, No. 2, Mar. 2008, 109-129 (21 pages).

Slepian, David, "Permutation Modulation", Proceedings of the IEE, vol. 53, No. 3, Mar. 1965, 228-236 (9 pages).

Stan, Mircea, et al., "Bus-Invert Coding for Low-Power I/O", IEEE Transactions on Very Large Scale Integration (VLSI) Systems, vol. 3, No. 1, Mar. 1995, 49-58 (10 pages).

Tallini, Luca, et al., "Transmission Time Analysis for the Parallel Asynchronous Communication Scheme", IEEE Transactions on Computers, vol. 52, No. 5,, May 2003, 558-571 (14 pages).

Wang, Xin, et al., "Applying CDMA Technique to Network-on-Chip", IEEE Transactions on Very Large Scale Integration (VLSI) Systems, vol. 15, No. 10, Oct. 1, 2007, 1091-1100 (10 pages).

\* cited by examiner

CLOCK-EMBEDDED VECTOR SIGNALING CODES

CROSS-REFERENCE TO RELATED APPLICATIONS

This application is a continuation of U.S. application Ser. No. 15/390,293, filed Dec. 23, 2016, entitled "Vector Signaling Codes with High Pin-Efficiency for Chip-to-Chip Communication and Storage", which is a continuation of U.S. application Ser. No. 15/176,085, filed Jun. 7, 2016, entitled "Clock-Embedded Vector Signaling Codes", which is a continuation of U.S. application Ser. No. 14/636,098, filed Mar. 2, 2015, entitled "Clock-Embedded Vector Signaling Codes", which claims the benefit of U.S. Provisional Application No. 61/946,574 filed on Feb. 28, 2014, all of which are hereby incorporated herein by reference in their entirety for all purposes.

The field of the invention generally relates to communications systems for conveying information with vector signaling codes.

REFERENCES

The following references are herein incorporated by reference in their entirety for all purposes:

U.S. Patent Publication No. 2011/0268225 of U.S. patent application Ser. No. 12/784,414, filed May 20, 2010, naming Harm Cronie and Amin Shokrollahi, entitled "Orthogonal Differential Vector Signaling", hereinafter identified as [Cronie I];

U.S. patent application Ser. No. 13/030,027, filed Feb. 17, 2011, naming Harm Cronie, Amin Shokrollahi and Armin Tajalli, entitled "Methods and Systems for Noise Resilient, Pin-Efficient and Low Power Communications with Sparse Signaling Codes", hereinafter identified as [Cronie II];

U.S. Provisional Patent Application No. 61/753,870, filed Jan. 17, 2013, naming John Fox, Brian Holden, Peter Hunt, John D Keay, Amin Shokrollahi, Richard Simpson, Anant Singh, Andrew Kevin John Stewart, and Giuseppe Surace, entitled "Chip-to-Chip Communication with Reduced SSO Noise", hereinafter identified as [Fox I];

U.S. patent application Ser. No. 13/842,740, filed Mar. 15, 2013, naming Brian Holden, Amin Shokrollahi and Anant Singh, entitled "Methods and Systems for Skew Tolerance in and Advanced Detectors for Vector Signaling Codes for Chip-to-Chip Communication", hereinafter identified as [Holden I];

U.S. Provisional Patent Application No. 61/934,804, filed Feb. 2, 2014, naming Ali Hormati and Amin Shokrollahi, entitled "Methods for Code Evaluation Using ISI Ratio", hereinafter identified as [Hormati I];

U.S. Provisional Patent Application No. 61/934,807, filed Feb. 2, 2014, naming Amin Shokrollahi, entitled "Vector Signaling Codes with High pin-efficiency and their Application to Chip-to-Chip Communications and Storage", hereinafter identified as [Shokrollahi I];

U.S. Provisional Patent Application No. 61/839,360, filed Jun. 23, 2013, naming Amin Shokrollahi, entitled "Vector Signaling Codes with Reduced Receiver Complexity", hereinafter identified as [Shokrollahi II].

The following additional references to prior art have been cited in this application:

U.S. Pat. No. 7,053,802, filed Apr. 22, 2004 and issued May 30, 2006, naming William Cornellus, entitled "Single-Ended Balance-Coded Interface with Embedded-Timing", hereinafter identified as [Cornelius];

U.S. Pat. No. 8,064,535, filed Mar. 2, 2007 and issued Nov. 22, 2011, naming George Wiley, entitled "Three Phase and Polarity Encoded Serial Interface, hereinafter identified as [Wiley].

FIELD OF THE INVENTION

The present invention relates generally to the field of communications, and more particularly to the transmission of signals capable of conveying information within and between integrated circuit devices.

BACKGROUND

In communication systems, a goal is to transport information from one physical location to another. It is typically desirable that the transport of this information is reliable, is fast and consumes a minimal amount of resources. One common information transfer medium is the serial communications link, which may be based on a single wire circuit relative to ground or other common reference, or multiple such circuits relative to ground or other common reference. A common example uses singled-ended signaling ("SES"). SES operates by sending a signal on one wire, and measuring the signal relative to a fixed reference at the receiver. A serial communication link may also be based on multiple circuits used in relation to each other. A common example of the latter uses differential signaling ("DS"). Differential signaling operates by sending a signal on one wire and the opposite of that signal on a matching wire. The signal information is represented by the difference between the wires, rather than their absolute values relative to ground or other fixed reference.

There are a number of signaling methods that maintain the desirable properties of DS while increasing pin efficiency over DS. Vector signaling is a method of signaling. With vector signaling, a plurality of signals on a plurality of wires is considered collectively although each of the plurality of signals might be independent. Each of the collective signals is referred to as a component and the number of plurality of wires is referred to as the "dimension" of the vector. In some embodiments, the signal on one wire is entirely dependent on the signal on another wire, as is the case with DS pairs, so in some cases the dimension of the vector might refer to the number of degrees of freedom of signals on the plurality of wires instead of exactly the number of wires in the plurality of wires.

With binary vector signaling, each component or "symbol" of the vector takes on one of two possible values. With non-binary vector signaling, each symbol has a value that is a selection from a set of more than two possible values. Any suitable subset of a vector signaling code denotes a "sub code" of that code. Such a subcode may itself be a vector signaling code.

A vector signaling code, as described herein, is a collection C of vectors of the same length N, called codewords. The ratio between the binary logarithm of the size of C and the length N is called the pin-efficiency of the vector signaling code.

FIG. 1 illustrates a prior art communication system employing vector signaling codes. Bits x0, x1, . . . enter block-wise 100 into an encoder 105. The size of the block may vary and depends on the parameters of the vector signaling code. The encoder generates a codeword of the vector signaling code for which the system is designed. In operation, the encoder may generate information used to control PMOS and NMOS transistors within driver 110, generating voltages or currents on the N communication wires 115. Receiver 120 reads the signals on the wires, possibly including amplification, frequency compensation, and common mode signal cancellation. Receiver 120 provides its results to decoder 125, which recreates the input bits 130.

Depending on which vector signaling code is used, there may be no decoder, or no encoder, or neither a decoder nor an encoder. For example, for the 8b8w code disclosed in [Cronie II], both encoder 105 and decoder 125 exist. On the other hand, for the Hadamard code disclosed in [Cronie I], an explicit decoder may be unnecessary, as the system may be configured such receiver 120 generates output bits 130 directly.

The operation of the transmitter, consisting of elements 100, 105, and 110, and that of the receiver, consisting of elements 120, 125, 130 have to be completely synchronized in order to guarantee correct functioning of the communication system. In some embodiments, this synchronization is performed by an external clock shared between the transmitter and the receiver. Other embodiments may combine the clock function with one or more of the data channels, as in the well-known Biphase encoding used for serial communications.

One important example is provided by memory interfaces in which a clock is generated on the controller and shared with the memory device. The memory device may use the clock information for its internal memory operations, as well as for I/O. Because of the burstiness and the asynchronicity of memory operations, the I/O may not be active all the time. Moreover, the main clock and the data lines may not be aligned due to skew. In such cases, additional strobe signals are used to indicate when to read and write the data.

BRIEF DESCRIPTION

Vector signaling codes providing guaranteed numbers of transitions per unit transmission interval are described, along with a generalized system architecture. Elements of the architecture may include multiple communications subsystems, each having its own communications wire group or sub-channel, clock-embedded signaling code, pre- and post-processing stages to guarantee the desired code transition density, and global encoding and decoding stages to first distribute data elements among the sub-systems, and then to reconstitute the received data from its received sub-system elements. Example embodiments of each architectural elements are described, as well as example code embodiments suitable for sub-channel communication.

DETAILED DESCRIPTION

Figure 2:
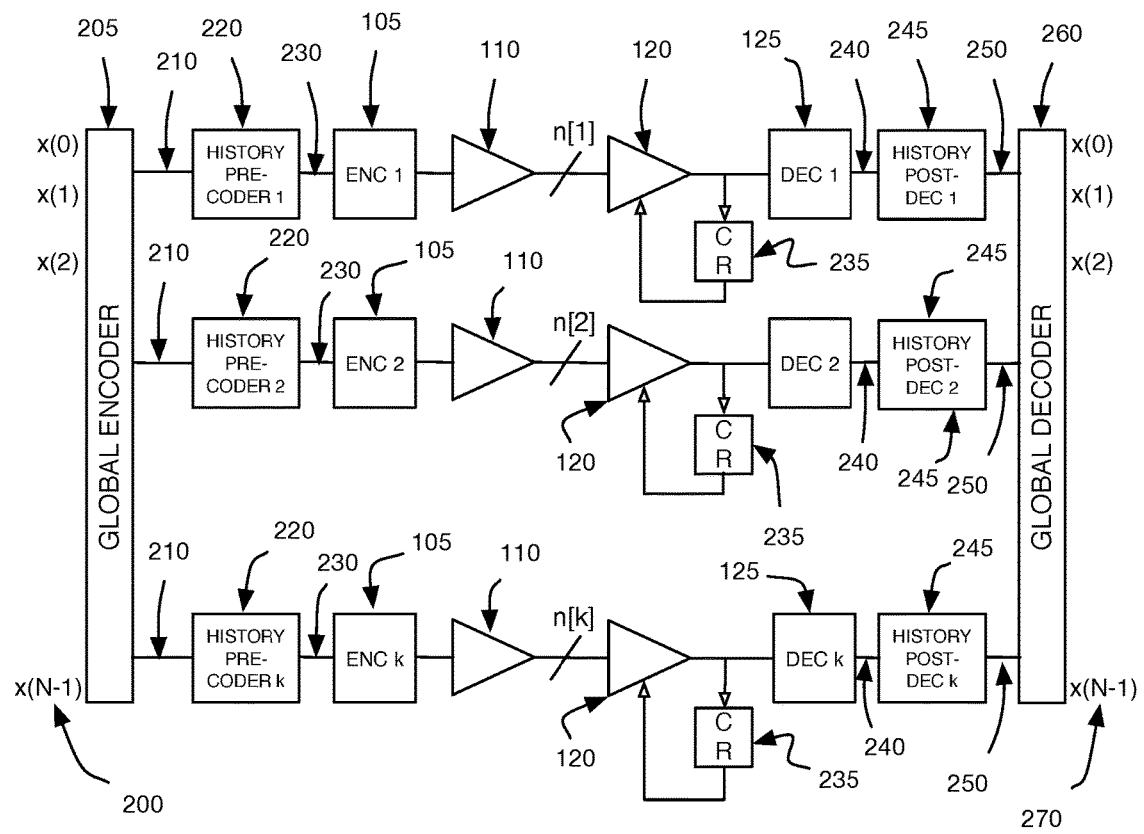
FIG. 2 shows an embodiment of a vector signaling communications system with embedded clock information.

An embodiment of a vector signaling communication system with embedded clock information is shown in FIG. 2. Elements of this system will be referenced and further described in descriptions of subsequent figures.

The communication system of FIG. 2 consists of k distinct communication sub-systems, each comprising a history pre-coder 220, encoder 105, driver 110, n[i] communication wires, receiver 120, a clock-recovery unit 235, decoder 125, history post-decoder unit 245. There are a total of n[1]+n[2]+ . . . +n[k] communication wires, subdivided into k groups having n[1], n[2], . . . , n[k] wires, respectively. Each communication sub-system i utilizes a vector signaling code in which the codewords have n[i] coordinates.

As exemplified in this figure, bits $x(0), \ldots, x(N-1)$ enter as a block into "Global Encoder" unit 205. In some embodiments, this unit may only forward the bits in subgroups, while in other embodiments this unit may perform further computations on the incoming bits 200. Global Encoder 205 outputs k groups of bits 210, one for each of the communication sub-systems.

The i-th group of bits 210 enters the i-th history pre-coder unit 220, which in turn outputs another group of bits 230 which is forwarded to encoder 105 of the communication sub-system. Encoder 105 generates a codeword of its corresponding vector signaling code, and driver 110 drives the coordinates of this codeword on the n[i] communication wires as voltages or currents.

The communication wire voltages or currents are received as signals by receiver 120, which may perform further equalization and processing of the received signals, and may generate information for the clock-recovery unit 235 which recovers the clock information from the received signals. The received signals are further forwarded to decoder 125, which generates a group of bits 240 forwarded to the corresponding history post-decoder unit 245. This unit calculates a possibly new set of bits 250 and forwards these to the Global Decoder unit 260. As with the corresponding Global Encoder, in some embodiments Global Decoder 260 simply concatenates or combines inputs 250 to obtain output bits 270, while in other embodiments Global Decoder 260 performs additional calculations on the bits received 250 from the various history post-decoder units to re-generate the bits x(0), . . . , x(N−1) output as 270. The number of codewords of the vector signaling codes used in the i-th communication sub-system of FIG. 2 is denoted by M(i) in the following.

In accordance with at least one embodiment, reception of distinct codewords in each unit interval provides a self-clocking capability. Thus, decoder 125 may consider a previous unit interval ended and a new unit interval (and thus, a new need to decode a codeword) begun each time a new (i.e., different from the preceding codeword) appears at its input. In such an embodiment, for every unit interval a codeword is transmitted on each communication sub-system that is different from the codeword sent in the previous unit interval. Thus, the number of possible codewords across all the communication sub-systems is $$(M(1)-1)*(M(2)-1)* \ldots *(M(k)-1) \qquad \text{(Eqn. 1)}$$

Figure 3:
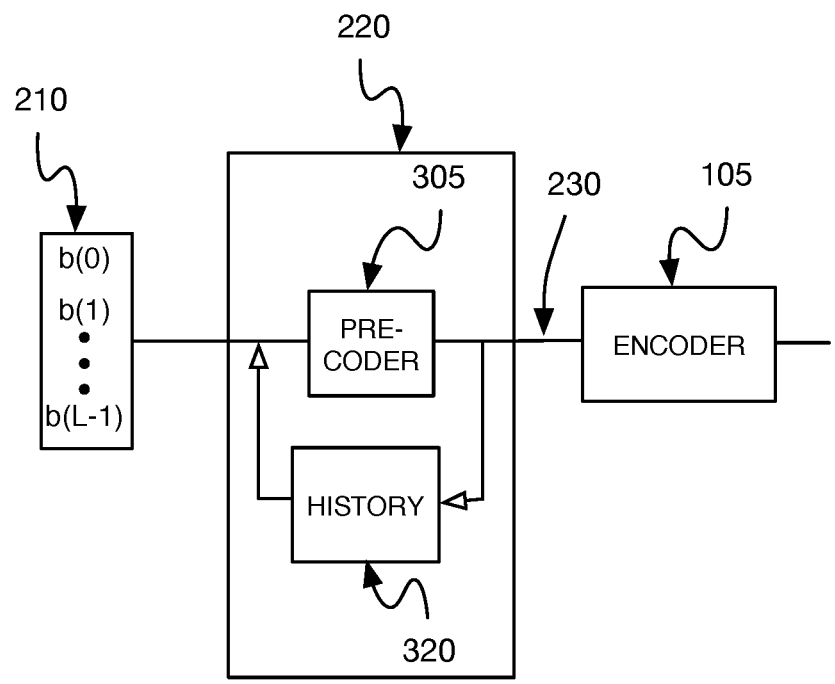
FIG. 3 is a block diagram of one embodiment of the history pre-coder.

An embodiment of the history pre-coder unit 220 is shown in FIG. 3. One task of this unit is to make sure that the same codeword of the vector signaling code is not sent on the corresponding communication wires (also referred to herein as a sub-channel) in two consecutive unit intervals. Where the vector signaling code receiver uses comparators for the detection of the codeword, that condition guarantees that the output of at least one of the comparators changes value from one unit interval to the next. This value change can then be used to recover the clock information, to be subsequently described in more detail.

As shown in FIG. 3, the history pre-coder unit comprises a pre-coder 305 and a history memory unit 320. Upon receiving the block of bits b(0), . . . b(L−1) from the Global Encoder 205, the pre-coder 305 computes its output using these bits, and the history bits in 320. It forwards the resulting bits 230 to the encoder 105, and simultaneously replaces the value of the history memory 320 with these bits. In some embodiments described below, the history memory 320 may keep the vector signaling codeword that was transmitted in the previous clock cycle and use a pre-coder which makes sure that the next transmitted codeword differs from the previous one. Such examples are given below for various types of vector signaling codes.

Figure 4:
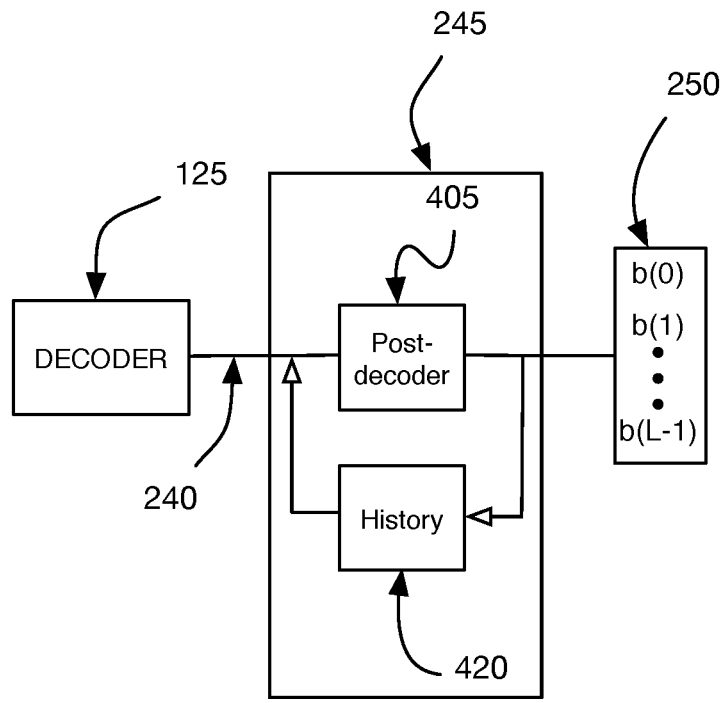
FIG. 4 is a block diagram of one embodiment of the history post-decoder.

Similarly, an embodiment of the history post-decoder unit 245 is shown in FIG. 4. It comprises a post-decoder unit 405 and a history memory unit 420. Upon receiving the block 240 of bits from encoder 125, the post-decoder calculates a possibly new block of bits from the bits in 240 and the bits in its history unit 420, forwards the new bits 250 to the Global Decoder 260, and replaces the bits in its history unit with these bits.

Figure 5:
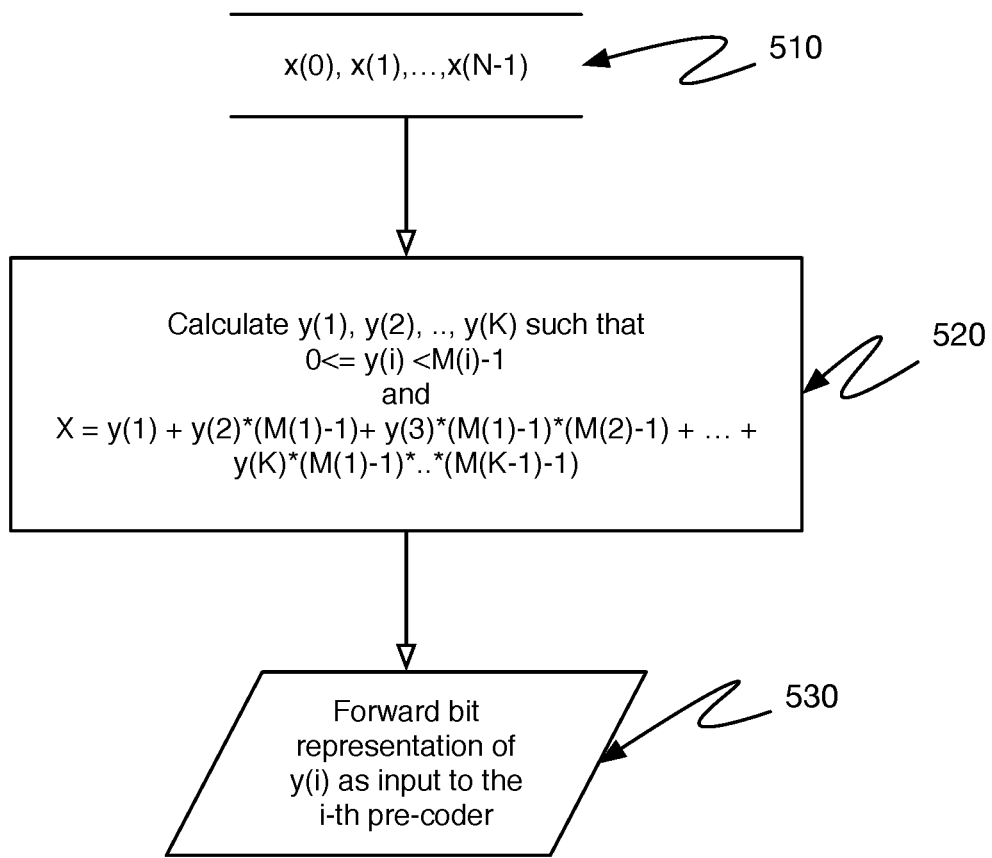
FIG. 5 is a flow chart for one embodiment of the Global Encoder.

A flow-chart of an exemplary embodiment of the Global Encoder 205 is given in FIG. 5. The main task of the Global Encoder is to compute from the given block of bits x(0), . . . , x(N−1) a number k of blocks of bits, one for every communication sub-system in FIG. 2, such that these blocks are uniquely determined by the incoming bits 200, and vice-versa. In the procedure described in FIG. 5, the incoming bits x(0), . . . , x(N−1) in 510 are used in Step 520 to compute bit-representations of reduced-modulus integers y(1), y(2), . . . , y(k), wherein each y(i) is an integer from 0 to M(i)−2 inclusive (note that y(i) is strictly less than M(i)−1, and hence referred to herein as having a reduced-modulus), and wherein M(i) is the number of codewords of the vector signaling code used in the i-th communication sub-system in FIG. 2.

It might be expected that when converting a number to a mixed-based representation (i.e., a mixed modulus), the digits in each position would range from 0 to M−1, where the modulus M is determined by the number of possible signals, M. That is, if there are M possible signals or codes available to represent the digits (e.g., base 10 uses ten digits: 0 through 9, and base 5 uses five digits: 0 through 4), a typical conversion might use M values: 0 to M−1. Note, however, that the conversions described herein uses digits 0 through M−2, and thus uses a reduced modulus of M−1 compared to what would normally be available with a set of M signals, or vector code codewords. The advantages of using the reduced modulus values are described below.

The particular way this calculation is done in Step 520 is by representing the integer X whose binary representation is x(0), . . . , x(N−1), with x(0) being the least significant and x(N−1) being the most significant bit, as $$X=\Sigma_{i=1}^{k} y(i) \Pi_{j=1}^{i-1}(M(j)-1). \qquad \text{(Eqn. 2)}$$

Many different algorithms may be used to perform this computation, as is known to those of skill in the art. For example, where 0≤X<257, so N=9, M(1)=M(2)=12, M(3)=6, then we have y(1)=X mod 11, y(2)=(X−y(1))/11 mod 11, and y(3)=(X−y(1)−11*y(2))/121.

Figure 6:
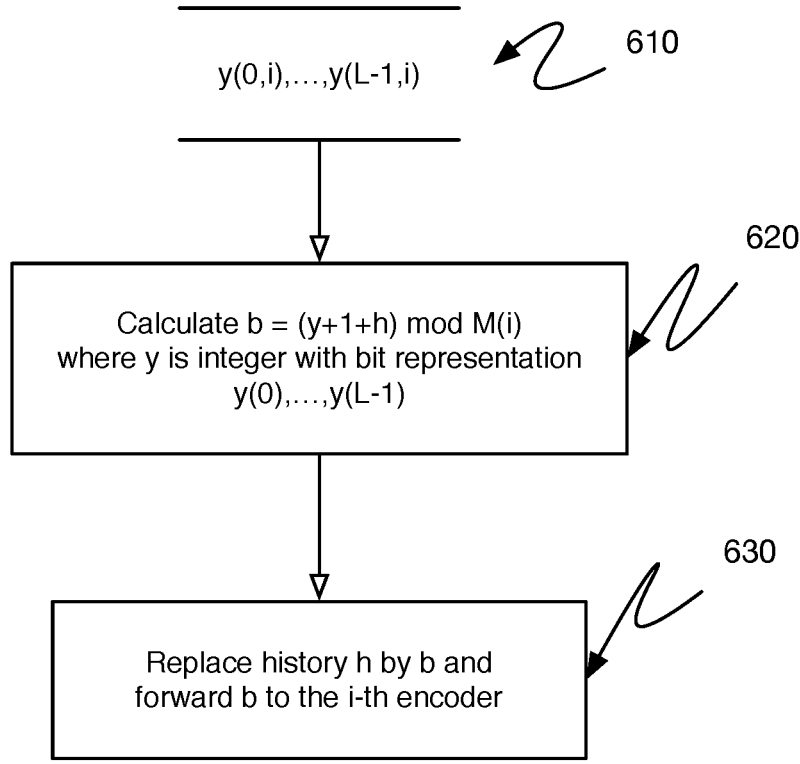
FIG. 6 is a flow chart of one embodiment of the pre-code unit.

One embodiment of a general procedure for pre-code unit 220 is outlined in FIG. 6. It is assumed that the bits in the history memory unit 320 of FIG. 3 represent an integer, called h, in this figure. Upon receiving the block of L bits y(0,i), . . . , y(L−1,i) as the i-th output 210 of Global Encoder 205, the pre-coder calculates in Step 620 the integer b=(y+1+h) mod M(i), wherein y is the integer with bit-representation y(0,i), . . . , y(L−1,i), and M(i) is the number of codewords of the i-th vector signaling code. It is assumed that the integer h is between 0 and M(i)−1, so it corresponds uniquely to a codeword of the i-th vector signaling code. Moreover, since the value of y is, by construction, smaller than M(i)−1 (i.e., ≤M(i)−2), we always have that b is not equal to h mod M(i). Since h corresponds to the index of the codeword in the i-th vector signaling code transmitted in the last unit interval, and b corresponds to the index of the codeword transmitted in the current unit interval, this type of calculation makes sure that no two consecutive codewords are the same. The use of the reduced modulus in calculating the integers y causes the encoder to generate an output codeword that is different from the immediately prior codeword based on the reduced modulus digit (y) and the prior codeword (h). In summary, after an initial codeword h, selected from M codewords (0 to M−1), has been sent in a first signaling interval, a subsequent codeword is selected based on h+1+y, where y is a data-dependent reduced-modulus (M−1) integer and is in the range 0 to M−2, such that no valid data-dependent reduced modulus integer will result in the subsequent codeword equaling the initial codeword h.

Other types of operations or the pre-code unit are also possible. For example, where M(i) is a power of 2, it is possible to ensure the distinctness of b and h using simple XOR arithmetic, as will be shown in the subsequent example of an ENRZ encoder.

Figure 7:
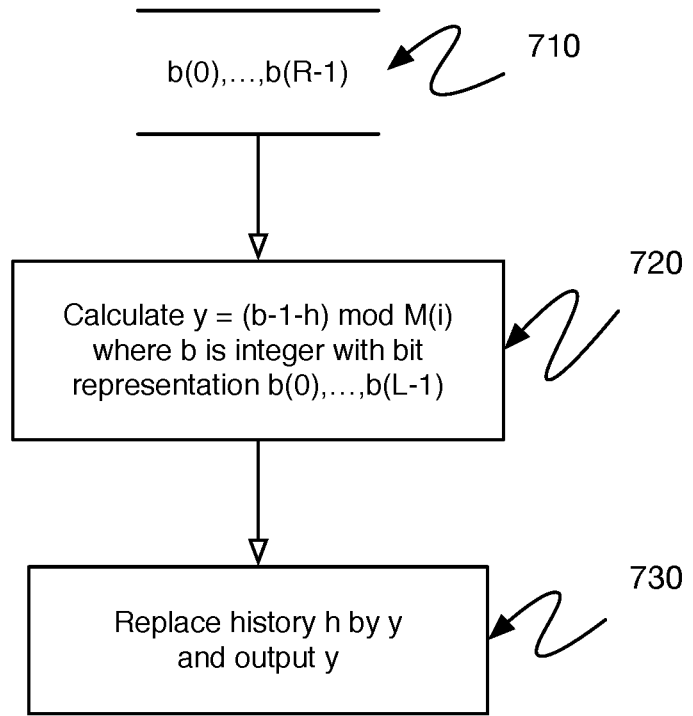
FIG. 7 is a flow chart for one embodiment of the post-decoder unit.

An embodiment of the operation of the post-decoder unit 245 is shown in FIG. 7. The input to this procedure is a block of bits b(0), . . . , b(R−1) in Step 710. This block may have been produced by the decoder 125 of the i-th communication sub-system illustrated in FIG. 2. In Step 720, the post-decoder unit may use the bits in its memory history unit, interpreted as an integer h, to calculate an integer y=(b−1−h) mod M(i), wherein b is the integer with bit-representation b(0), . . . , b(R−1). In Step 730 the history value h is replaced by b, and simultaneously, b is forwarded to the Global Decoder 260.

Figure 8:
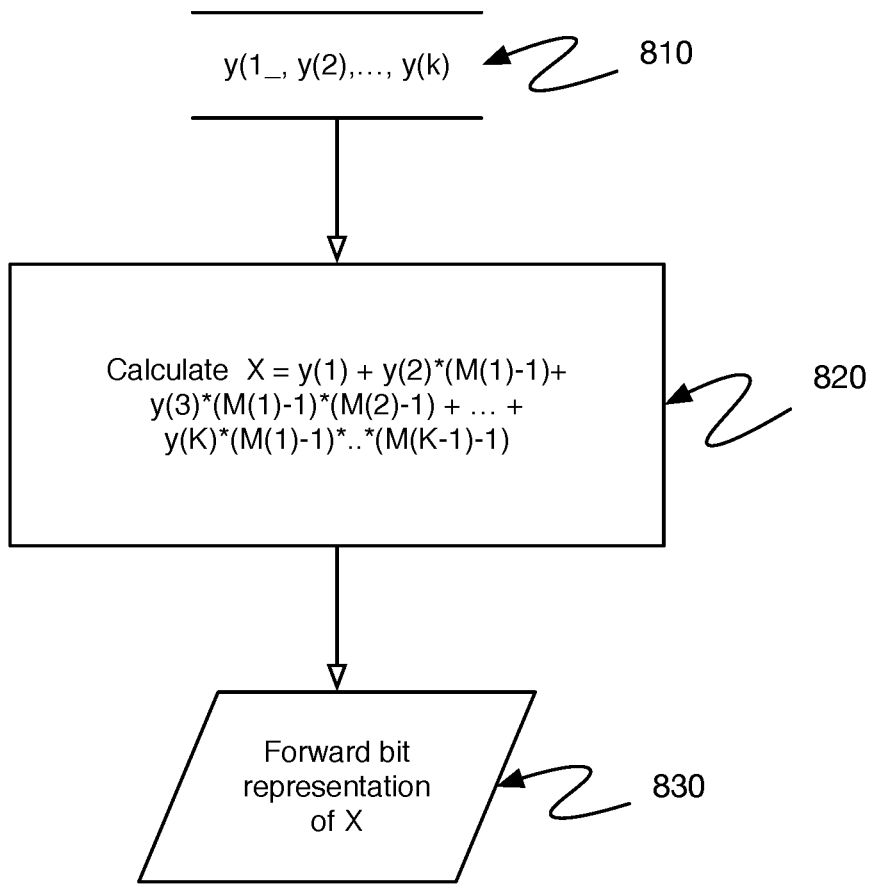
FIG. 8 is a flow chart for one embodiment of the Global Decoder.

The operation of an embodiment of the Global Decoder 260 is given in FIG. 8. The input to this procedure are y(1), . . . , y(k), wherein each y(i) is a block of bits generated by the post-decoder unit of the i-th communication sub-system. In Step 820 an integer X is calculated from y(1), . . . , y(k) according to the formulation in (Eqn. 2). The bit representation of this integer is the desired sequence of bits 270 in FIG. 2.

As mentioned above, in some applications the Global Encoder 205 may only forward the incoming bits in subgroups to the corresponding communication sub-systems, and the Global Decoder 260 may just collect the incoming bit blocks and concatenate them to obtain the bits 270. Some such examples are discussed further below.

Clock Extraction

[Holden I] describes comparator-based detectors for vector signaling codes designed such that no comparator is presented with ambiguous decision conditions; that is, at all times each comparator output is either explicitly true, or explicitly false. An embodiment based on such codes and detectors may be combined with a simple transition detector to extract sub-system transition information (herein called the "edge signal") to drive a clock extraction circuit, as in 235 of FIG. 2. Three circuits for these codes are detailed below. These are referred to in said descriptions as AH-DF-HPF, UDH-DF-HPF, and A-XOR.

The fourth type of clock extractor, referred to in said descriptions as PCD-DH, uses a per-codeword detector. This type of detector works with vector signaling codes in which the comparator outputs have ambiguous outputs.

In general, clock extraction embodiments detect changes in sub-system detector outputs. In some embodiments, only changes from one valid codeword to another valid codeword are detected, and in other embodiments decision feedback and/or hysteresis is provided to the input signal comparators to avoid extraneous transitions caused by signal reflections and noise. Any of a number of methods may then be used to analyze the edge signal to eliminate artifacts caused by near-simultaneous detector output transitions, including methods known to the art, producing a reliable sampling clock derived from the detector edges. One such embodiment incorporates fixed or variable delay stages and a simple state machine configured such that a clock output is produced a fixed delay time after the last edge signal transition, suppressing the effect of multiple edge signal transitions within the delay interval.

As will be apparent to one of skill in the art, propagation delay differences (also know as skew) within a communications channel group will result in different arrival times for receive data. If the amount of this skew is significant (i.e. more than a transmit unit interval), the teachings of [Holden I] may be applied to permit the coherent reconstruction of aggregated receive data.

Similarly, a communications system utilizing multiple sub-systems may generate a global receive clock by applying the same edge signal generation and sampling clock derivation methods using the individual sub-system receive clocks as inputs, and producing a global sampling clock suitable for sampling the aggregated receive data as obtained at 270 of FIG. 2. As in sub-system clock extraction, embodiments presenting significant skew between sub-system results must carefully control generation of an aggregate or global decoder output clock, such that all of the global decoder's component inputs are valid and the result meets all necessary set-up and hold times for subsequent circuits. Some embodiments may require intermediary holding latches on the sub-system results and/or other skew mitigation measures as taught by [Holden I] or as generally applied in practice.

Code/Receiver Categories for Clock Extraction

The codes and the receivers that accompany them that are used with these clocking solutions can be divided into two categories. The first group of codes can be described as Unambiguous Comparator Output code/receiver (UCO). For these code/receiver combinations, the binary or multiwire comparator circuits used in the defined receiver have unambiguous outputs for every codeword in the code. An example of a code that is always UCO is the ENRZ code, also known as H4 code or Hadamard code of size 4, as described in [Cronie I].

The second group of codes can be called Ambiguous Comparator Output codes/receiver (ACO). In these code/receiver combinations, a given comparator is sometimes presented with inputs at the same level and thus has an ambiguous output for some codewords. These ambiguous outputs are later resolved in a decoder stage. An example of a code that is always ACO is the 8b8w code described in Cronie II.

In practical implementations, most codes are either UCO or ACO. There are a few codes that are ACO with one receiver implementation and UCO with another receiver implementation, typically with more complex multi-input analog detectors.

AH-DF-HPF—Analog Hysteresis Plus Decision Feedback High Pass Filter Clocking Solution The following clocking solution is only applicable to UCO code/receiver solutions.

Figure 16:
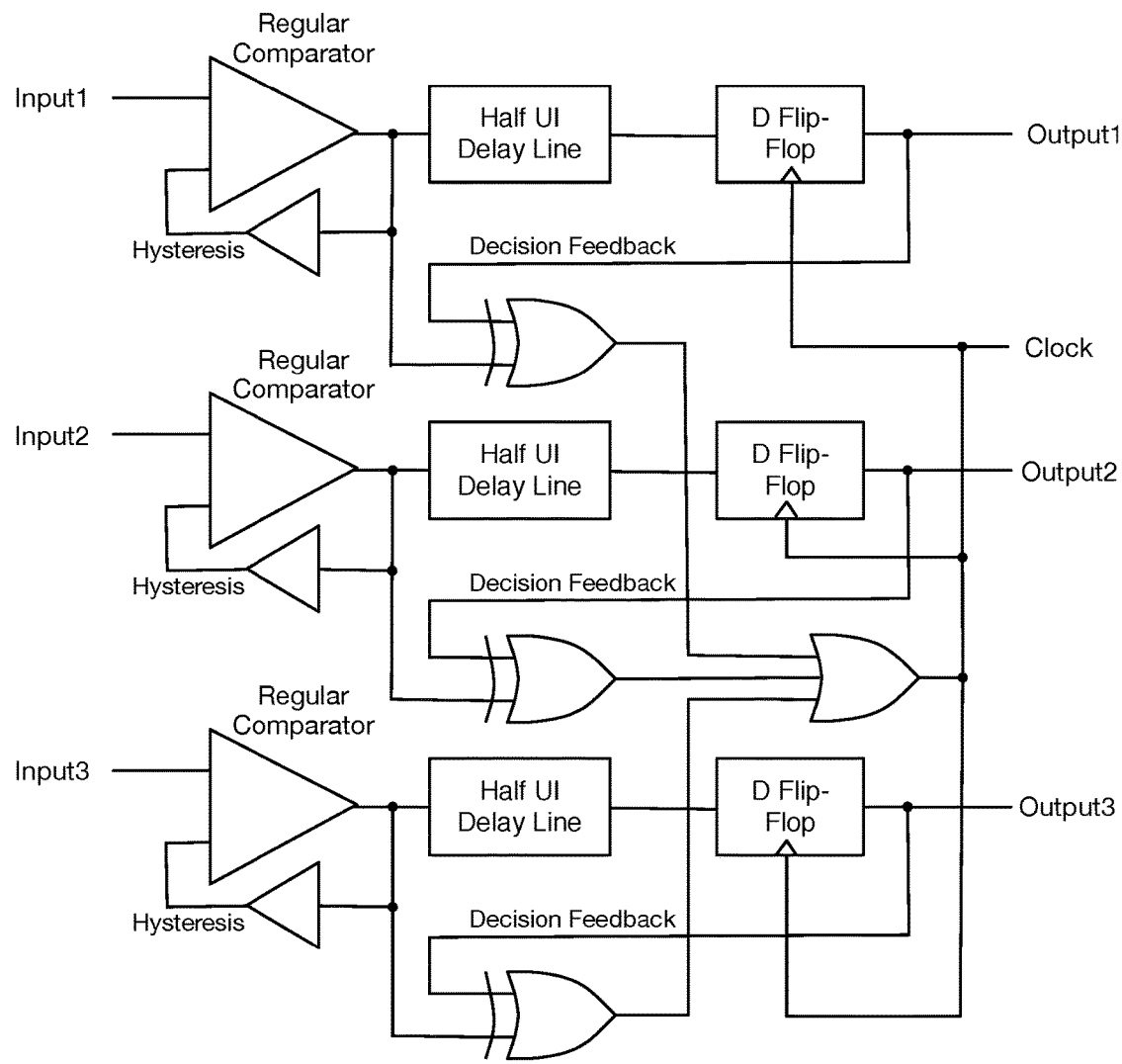
FIG. 16 shows an embodiment of clock extraction using Analog Hysterisis plus Decision Feedback High Pass Filter clocking.

The simplest clock extraction embodiment adds an analog hysteresis function to each of the comparators in order to filter out the multiple zero crossing on the wires that are caused by noise and reflections, as illustrated in FIG. 16. However, there are known disadvantages to such solutions. The maximum amplitude of any reflections on the communications channel must be known, so that the hysteresis offset value may be chosen correctly. Such embodiments are known to add jitter to the recovered clock, as noise or reflections on the leading edge can cause the transition to occur early, causing the effective eye opening in the timing dimension to close, and reducing the ability of the receiver to handle difficult channels. Similarly, the added hysteresis lowers the receive sensitivity of the comparators, reducing the eye opening in the amplitude dimension as well. Finally, such analog hysteresis embodiments contain a closed loop circuit that must be implemented carefully.

The function of the hysteresis comparator can be described as follows:

```
HysOut = Hysteresis(HysIn, HysOffset)
{
If HysOut == 0
   If HysIn > HysOffset, HysOut = 1;
   Else HysOut = 0;
else
   If HysIn > - HysOffset, HysOut = 1;
   Else HysOut = 0;
Endif;
}
```

For each detector, the hysteresis functions are applied to the comparators:

HysOffset=voltage value determined either statically or adaptively that exceeds the expected amplitude of reflections and other noise sources in the receive signal.

C(x)=Hysteresis(detector inputs(x), HysOffset)

In the following example, the value "x" is shown to range from 0 to 2 for clarity. This is the case for the ENRZ code. For other UCO codes, the value that "x" would range over is equal to the number of comparators.

The clock signal is created by using an exclusive- or function to look for changes on any of the wires. The code delivers a transition on one wire each clock:

Clock=(C(0) XOR Q(0)) OR (C(1) XOR Q(1)) OR (C(2) XOR Q(2))

For each comparator, the data is delayed by a delay line that has a nominal delay of one half of the unit interval (UI). The actual delay would depend on the implementation and may be somewhat less or more than one half the UI:

D(0)=HalfUIDelayLine(C(0))
D(1)=HalfUIDelayLine(C(1))
D(2)=HalfUIDelayLine(C(2))

For each comparator, recover each bit with a D Flip-Flop (DFF) or cascade of latches in some implementations:

Q(0)=DFF(Clock, D(0))
Q(1)=DFF(Clock, D(1))
Q(2)=DFF(Clock, D(2))
/*Decode and retime the data*/
DecodedData=Decode(Q(0), Q(1), Q(2))
RetimedDecodedData=DFFs(Clock, DecodedData)

UDH-DF-HPF—Unrolled Digital Hysteresis Plus Decision Feedback High Pass Filter Clocking Solution The following clocking solution is only applicable to UCO code/receiver solutions.

Figure 17:
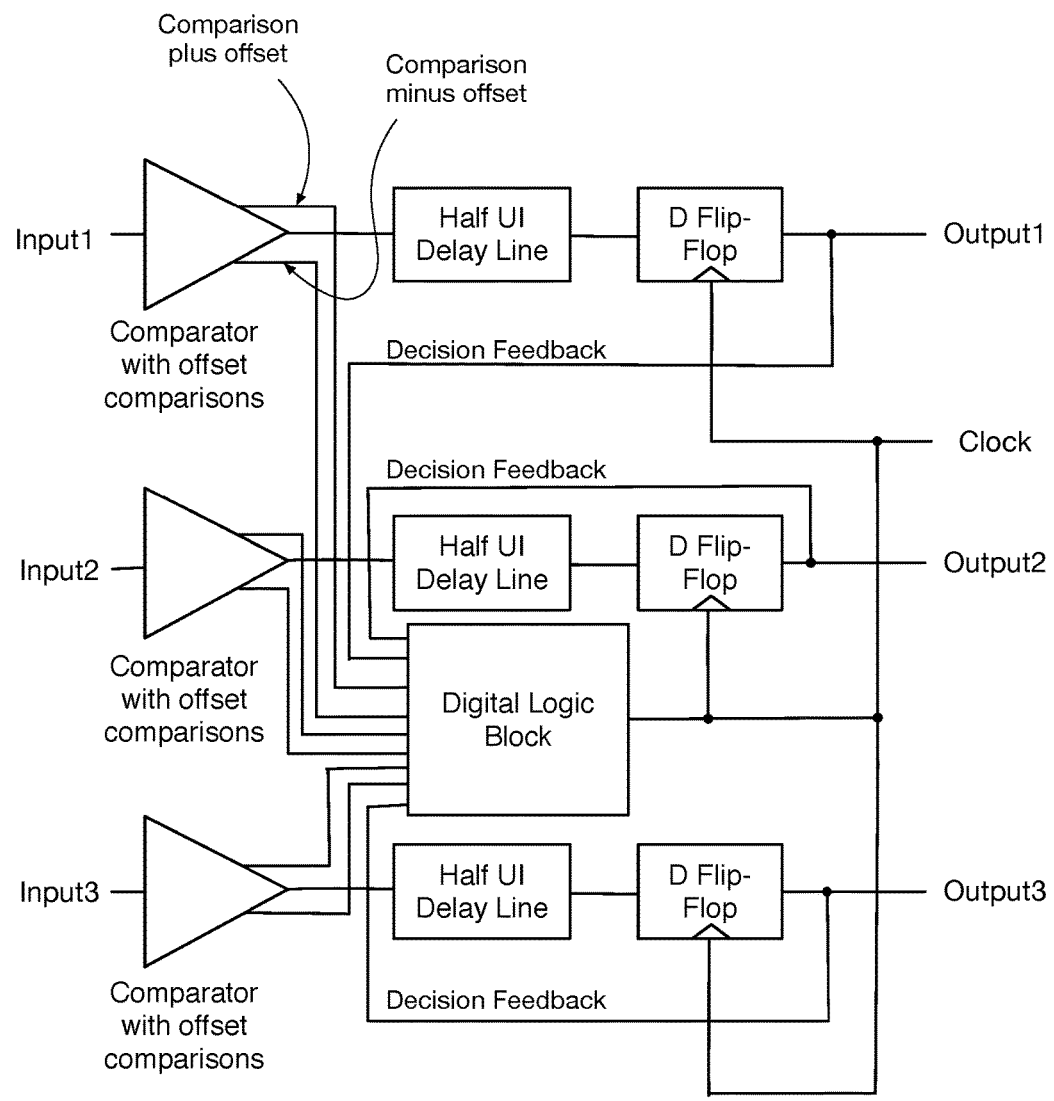
FIG. 17 shows an embodiment of clock extraction using Digital hysteresis plus Decision Feedback High Pass Filter clocking.

An embodiment of clocking solution AH-DF-HPF shown in FIG. 17 performs six additional binary comparisons, such that two values of a hysteresis comparison is provided along with each data comparison. This embodiment has the advantage that the closed loop portion of the hysteresis function is digital, and the data path portion of the circuit has better sensitivity than AH-DF-HPF. The disadvantages include greater implementation size and higher power consumption, because of the additional comparators needed to produce the required hysteresis comparisons.

One embodiment uses two extra separate comparators that add and subtract a fixed value from the analog inputs, rather than using analog hysteresis feedback. The hysteresis function may then be implemented digitally.

Another embodiment uses a combined comparator that delivers three outputs, the regular comparator output, an output with the comparison done with the offset added, and a third with the comparison done with the offset subtracted.

This example uses the embodiment with separate comparators. In this example, the function of the regular comparators is described as follows:

Comparator(Inputs)

The operation of the offset comparators adds the offset value to the comparator inputs before the comparison is done. It is be described as follows:

OffComparator(Inputs, HysOffset)

For a three-comparator code/receiver solution such as for the ENRZ code, the comparators are:

OffCompOutHigh(0)=OffComparator(Inputs(0), HysOffset)
CompOut(0)=Comparator(Inputs(0))
OffCompOutLow(0)=OffComparator(Inputs(0), −HysOffset)
HysCompOutHigh(1)=OffComparator(Inputs(1), HysOffset)
CompOut(1)=Comparator(Inputs(1))
HysCompOutLow(1)=OffComparator(Inputs(1), −HysOffset)
HysCompOutHigh(2)=OffComparator(Inputs(2), HysOffset)
CompOut(2)=Comparator(Inputs(2)) HysCompOutLow(2)=OffComparator(Inputs(2), −HysOffset)

This circuit recovers the clock by comparing the flip-flop outputs with the comparator outputs from the opposite side of center:

Clock=
((NOT Q(0)) AND CompOutHigh(0)) OR (Q(0) AND (NOT CompOutLow(0))) OR
((NOT Q(1)) AND CompOutHigh(1)) OR (Q(1) AND (NOT CompOutLow(1))) OR
((NOT Q(2)) AND CompOutHigh(2)) OR (Q(2) AND (NOT CompOutLow(2)))

The rest is the same as in the AH-DF-HPF embodiment.

A-XOR—Analog XOR Clocking Solution

Figure 18:
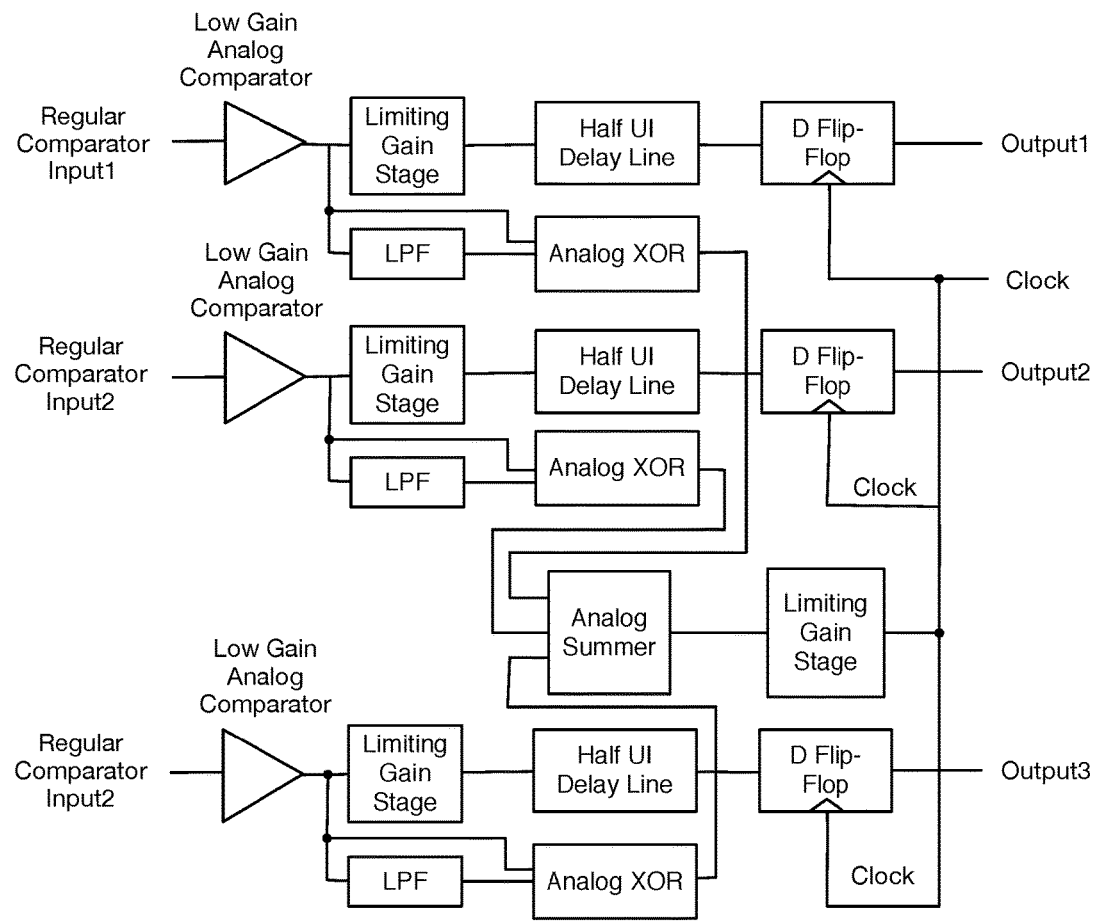
FIG. 18 illustrates an embodiment of clock extraction using Analog XOR clocking.

An embodiment of clock extraction using Analog XOR clocking is shown in FIG. 18. This embodiment is compatible with both UCO and ACO code/receiver solutions.

Each comparator function is divided into two halves. The first half of each comparator is a linear low gain comparator that performs the function of the comparator with a linear output. Each of these linear values is then passed through an analog low-pass filter. Each linear value is compared against the analog low-pass filtered version of itself by an analog XOR circuit, which serves as the second half of the comparison function. Analog XOR circuits are well known in the art. The analog XOR circuit will produce a voltage output that has a higher value if the inputs have different values than if they have the same value.

The outputs of the three analog XOR circuits are summed. The output of the summer is passed through a limiting gain stage to give the signal sharp edges. This signal then forms the clock.

In parallel to the clock path, in the data path, the output of the low gain comparator is passed through a gain stage to form a regular binary comparator. The clock is used to sample this data.

A challenge with this circuit is that the detected change is less for some code transitions than for others. This circuit is also sensitive to reflections and noise.

PCD-DH—Per Codeword Detectors, Digital Hysteresis Clocking Solution

This embodiment is compatible with both UCO and ACO code/receiver solutions.

Figure 19:
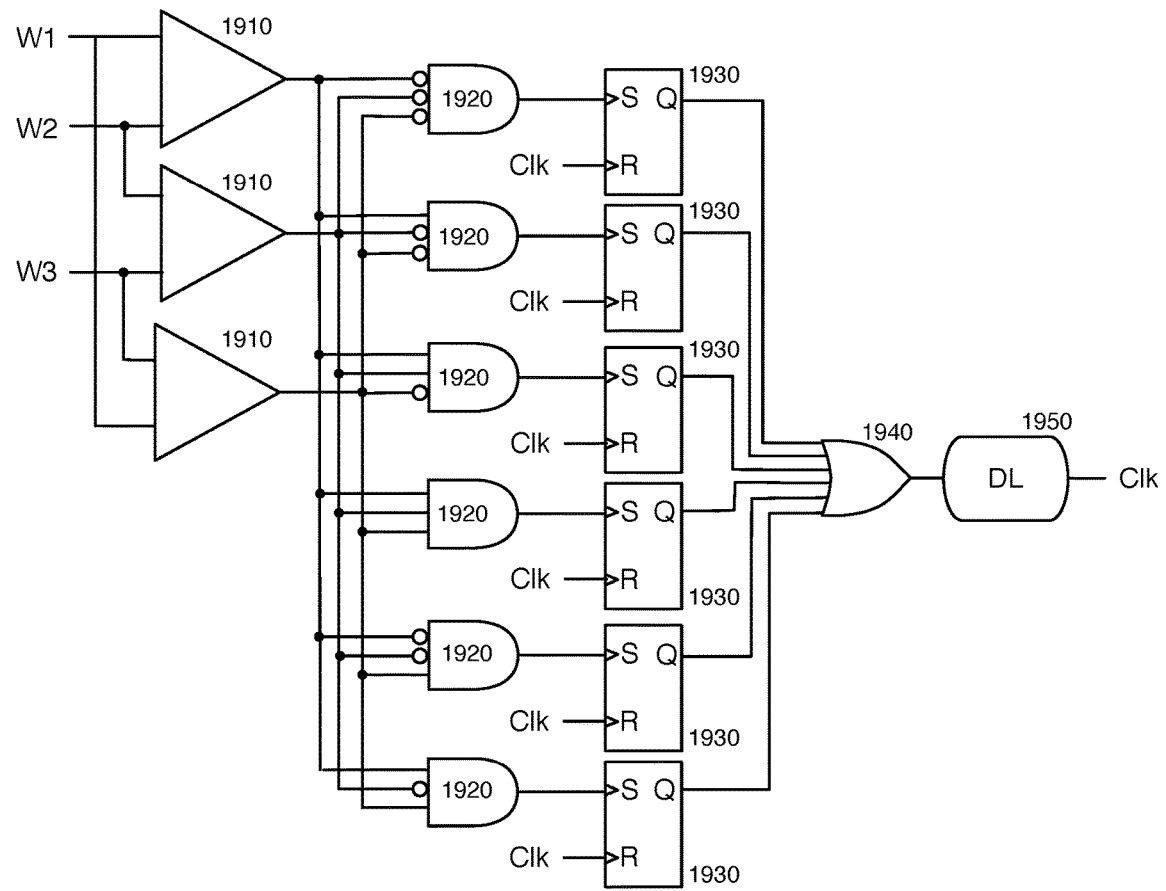
FIG. 19 illustrates an embodiment of clock extraction using per-codeword detectors and digital hysteresis.

As illustrated in FIG. 19, this embodiment of a clock extraction circuit does not use an analog hysteresis circuit. Instead it uses normal comparators 1910. A special unrolled and equal-delay digital detector is implemented that has one output for each of the allowed codewords.

These per-codeword outputs put out a high value if that codeword is present on the output of comparators 1910, and a low value if that codeword is not present. The circuit is implemented to have a roughly equal delay from the output of each of the comparators to the output of each of the per-codeword detector. An example of such an equal-delay circuit is a circuit that has a AND gate 1920 per codeword. That AND gate has the same number of legs as the number of comparators. The inputs of the legs of the AND gates are wired to the appropriate true or complement outputs of the comparators, here shown distinct true and complimentary inputs to each AND gate 1920. The particular decoded values shown are exemplary, and non-limiting.

When ACO codes are employed with this detector, the per-codeword detectors are only connected to those comparator outputs that are needed to detect that codeword and not to those that have an ambiguous value for that codeword.

The outputs of each of the per-codeword detectors is wired to the Set input of a per-codeword Resettable D Flip-Flop with the D input set to a high value (or equivalent circuit.) For purposes of illustration, the flip-flops 1930 are shown in FIG. 19 as edge triggered set/reset devices, with the output Q going true on a rising edge of input S, and going false on a rising edge of input R. Thus, any detected codeword by AND gates 1920 will cause the corresponding flip-flop 1930 to set. The outputs of all of these Flip-Flops 1930 are ORed together 1940 and delayed by a delay line 1950 that is statically or dynamically calibrated to create a rising edge in the middle of the data eye. Said rising edge signal is used as the clock in a data re-timer circuit. Said rising edge signal is also connected to the Reset input of each flip-flop 1930 to clear the detectors for the next clock cycle.

The described embodiment will catch the first instance within a clock cycle of a codeword being detected and will ignore subsequent reflections that cause zero-crossings.

Memory Links

As one specific example applying the previously described systems and methods, an embodiment is described of links connecting one or more Dynamic Random Access Memory (DRAM) units to a memory controller.

Traditionally, such links are byte-oriented, with each data byte communicated over 8 wires in a single-ended manner, and a 9th wire communicating a write mask signal identifying whether the data byte is to be applied or ignored in the associated memory operation. Two more wires provide a strobe signal using differential signaling. As has been noted in prior art such as [Wiley] and [Cornelius], the ability to embed the clock information into the data and hence eliminate the need for separate strobe signals can be advantageous. The following examples show several examples of vector signaling codes and how they can be used in conjunction with the general principles described above.

In order to have a system according to FIG. 2 for such a memory link, the number of vector signaling codewords in these applications has to satisfy the inequality $$257 \leq (M(1)-1)^* \ldots *(M(k)-1) \quad \text{(Eqn. 3)}$$

as 256 distinct codewords are required to communicate 8 bits of data, and at least a 257th codeword is required to communicate the notification provided by the write mask signal that this data byte is to be ignored for this memory operation.

Example 1: ENRZ3

ENRZ is a vector signaling code obtained from a 4×4 Hadamard transform, as described in [Cronie I]. It has eight codewords and transmits them on 4 wires. The eight codewords are the four permutations of the vector $(1, -\frac{1}{3}, -\frac{1}{3}, -\frac{1}{3})$ and the four permutations of $(-1, \frac{1}{3}, \frac{1}{3}, \frac{1}{3})$. In this case, k=3, and M(1)=M(2)=M(3)=8. The inequality of (Eqn. 3) is satisfied. The resulting embodiment is hereinafter called ENRZ3, referring to its three sub-systems, each utilizing ENRZ vector signaling code.

Figure 9:
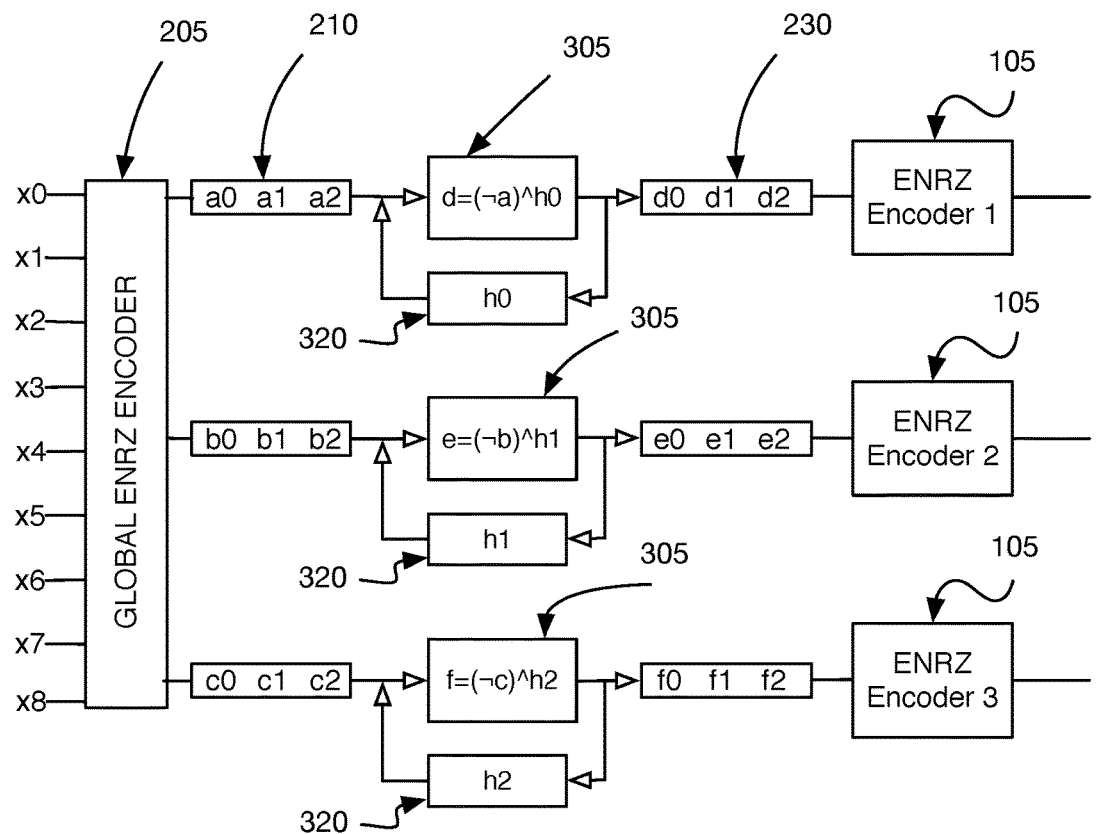
FIG. 9 is a block diagram of one embodiment of the transmitter encoding portions of an ENRZ3 communications system.

An exemplary operation of the encoder is detailed in FIG. 9. The input to the Global Encoder consists of 9 bits x0, x1, . . . , x8 corresponding to an integer between 0 and 256 inclusive (that is, 257 distinct values.) The Global Encoder may have an implementation as previously described in FIG. 5. It produces 3 groups of 3 bits, called (a0, a1, a2), (b0, b1, b2), and (c0, c1, c2), one group of bits for each ENRZ sub-system. Each of these vectors corresponds to the bit-representation of an integer modulo 7. This means that none of these vectors consists of three 1's. The history units 320 each contain 3 bits corresponding to the bit sequences transmitted in the previous unit interval, and called respectively h0, h1, and h2.

The pre-coding units 305 used in this example operate differently than the general pre-coding units described in FIG. 6, as the particular input characteristics permit simplification. Here, each pre-coding unit computes the XOR of the complement of the inputs 210 from the Global Encoder 205, with its corresponding history bits. Since none of the vectors 210 consists entirely of 1's, the complement of none of these vectors consists entirely of 0's, and hence the operation of the pre-coding unit ensures that the result of the operation is always different from the bits in the corresponding history units 320. Each of the pre-coding units forwards the computed bits to the corresponding ENRZ encoders 105, and simultaneously replaces the history bits with these bits.

Each communication sub-system in this embodiment transmits 3 bits on its corresponding 4-wire interface. The number of wires is therefore 12. Each sub-system uses 3 multi-input comparators (also known as generalized comparators, as described in [Holden I]) to recover its bits. The output of these comparators can be used to do a clock recovery on every one of the sub-systems, according to the teachings above. There are therefore a total of 9 comparators.

Figure 10:
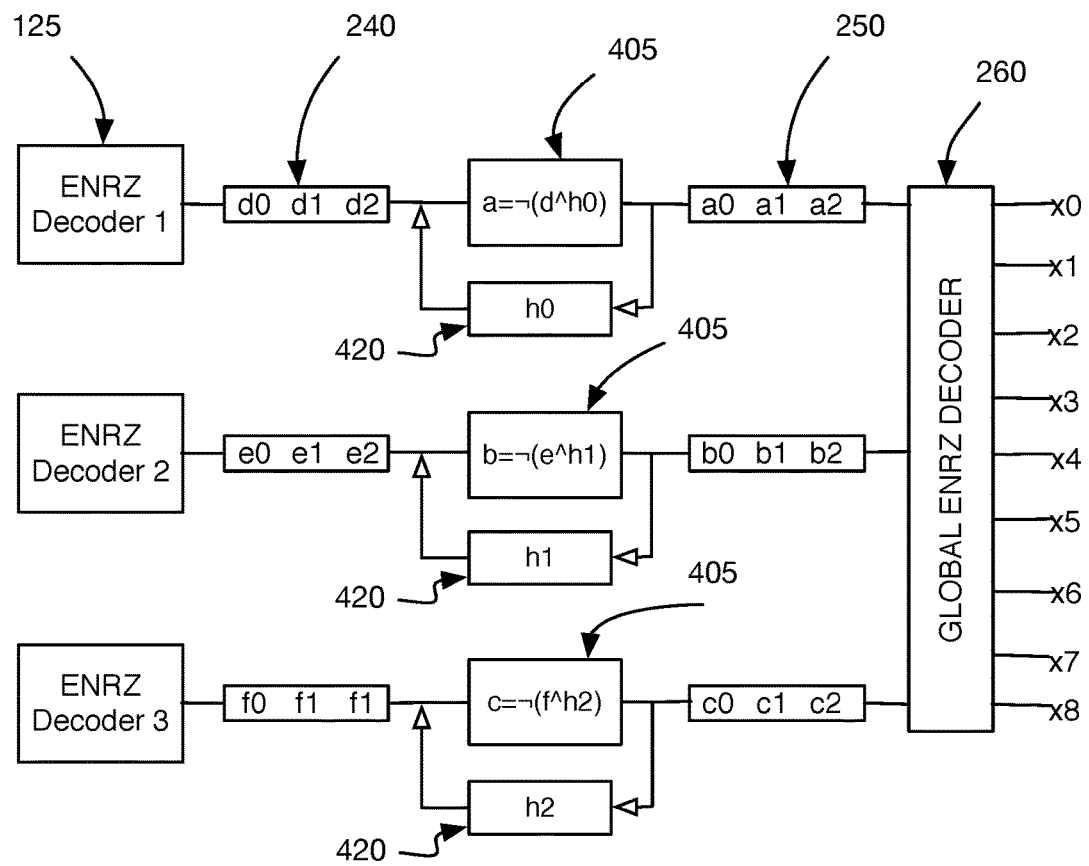
FIG. 10 is a block diagram of one embodiment of the receiver decoding portions of an ENRZ3 communications system.

FIG. 10 is an exemplary embodiment of the receiver portion of the decoder for this communication system. In operation, the ENRZ decoders 125 forward a group 240 of three bits each to the post-decoder units 405. These units XOR the incoming bits with the 3 bits in their history units 420, complement the result, and forward it to the Global Decoder 260. Simultaneously, they replace their three history bits with the forwarded bits.

The operation of the Global Decoder 260 in this embodiment may be as described in FIG. 8.

The ISI ratio of this coding system, as defined in [Hormati] is 1, which is the lowest ISI ratio possible. This means that this coding system has a low susceptibility to ISI noise. This communication system uses 12 signal wires, and 9 comparators. To enable operation at high data rates, the wires have to be routed in 3 low-skew groups of 4 wires each.

Example 2: S34

S3 is a vector signaling code on three wires consisting of the 6 permutations of the vector (+1, 0, −1). In this case, we may choose k=4, corresponding to four communication sub-systems in FIG. 2, and M(1)=M(2)=M(3)=M(4)=6, satisfying the inequality of (Eqn. 3). The resulting embodiment is hereinafter called S34, referring to its four sub-systems, each utilizing S3 vector signaling code. This coding scheme is similar to the one reported in [Wiley], though the details of the encoding and decoding are different.

Figure 11:
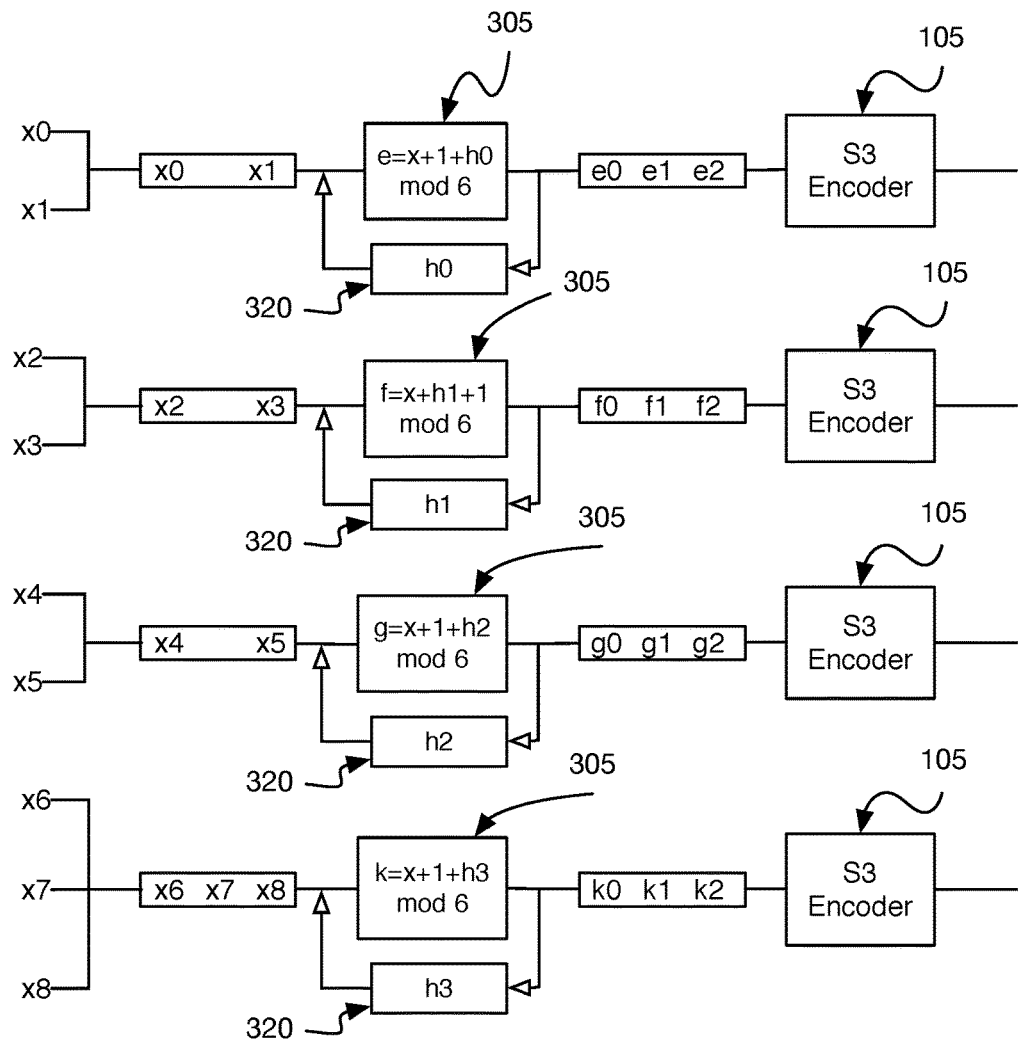
FIG. 11 is a block diagram of one embodiment of the transmission encoding portions encoder of a S34 communications system.

An embodiment of the encoder is detailed in FIG. 11. The input to the Global Encoder are the 9 bits x0, x1, . . . , x8 corresponding to an integer between 0 and 256 inclusive. This means that x0=x1= . . . =x7=0 if x8=1. In this communication system there is no Global Encoder unit. Instead, the incoming bits are subdivided into three groups (x0, x1), (x2, x3), (x4, x5) of two bits, and (x6, x7, x8) of three bits. Because of the restriction of the input bits, the fourth group corresponds to an integer between 0 and 4, inclusive.

The history units 320 each contain 3 bits corresponding to the bit sequences transmitted in the previous unit interval, and can be viewed as integers modulo 6, and called h0, h1, h2, and h3, respectively.

The pre-coding units 305 operate as described in FIG. 6. Each of the pre-coding units forwards the computed bits to the corresponding S3 encoders 105, and simultaneously replaces the history bits with these bits.

Each communication sub-system in this example transmits two or more bits on its corresponding 3-wire interface using ternary signaling. In preferred embodiments, the encoders 105 may conveniently represent their ternary output by generating two bit vectors of length 3 such that each bit vector has exactly one "1", and the positions of the 1's in these vectors are disjoint. In operation, the first bit vector may encode the position of the +1 in the vector signaling codes S3, and the second bit vector may encode the position of the −1, in the sense that a +1 is transmitted on the wire where the first bit vector is 1, a −1 is transmitted on the wire where the second bit vector is 1, and a 0 is transmitted on the wire if neither bit vector is 1. It will be apparent to one familiar with the art that the described bit vectors may be used to drive transistors in an output line driver generating the desired +1 and −1 output signal values.

Figure 12A:
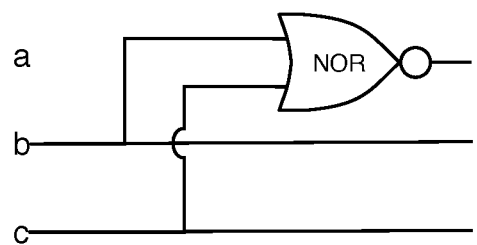
FIGS. 12A and 12B show schematic diagrams of two circuits providing an embodiment of an encoder for S34.
Figure 12B:
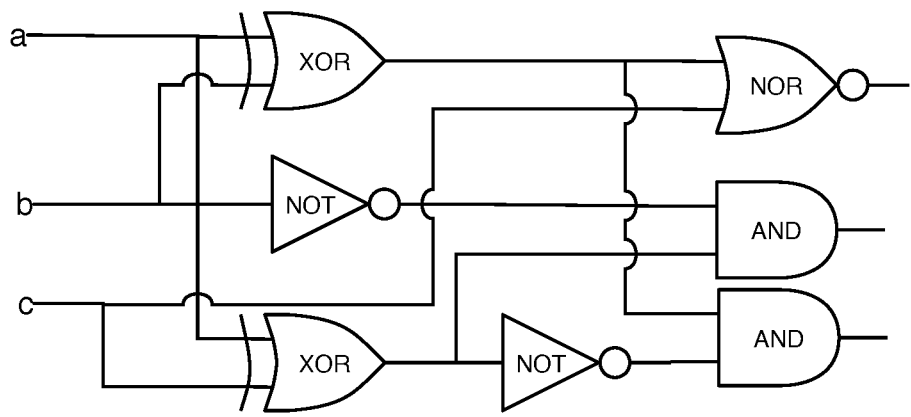

An example of the operation of such an encoder is described in FIGS. 12A and 12B, showing two logical circuits. The inputs to these circuits are three incoming bits a, b, c corresponding to an integer between 0 and 5, inclusive, where a is the least and c is the most significant bit of the integer. The circuit of FIG. 12A does not, in fact, use the input a, and computes its three outputs as NOR(b,c), b, and c. In operation, the output of this circuit may be interpreted as a mask for the position of +1 in the codeword of S3 chosen to be transmitted. The circuit in FIG. 12B uses all its three inputs and outputs, from top to bottom, the logical functions (¬(aˆc))&(aˆb), (¬b)&(aˆc), and NOR(c, aˆb), where ¬x is the complement of x, xˆy is the XOR of x and y, x&y is the logical AND of x and y, and NOR(x,y) is the NOR of x and y. The circuit described is only an example, and one moderate skill in the art will be aware of many other solutions.

Figure 1:
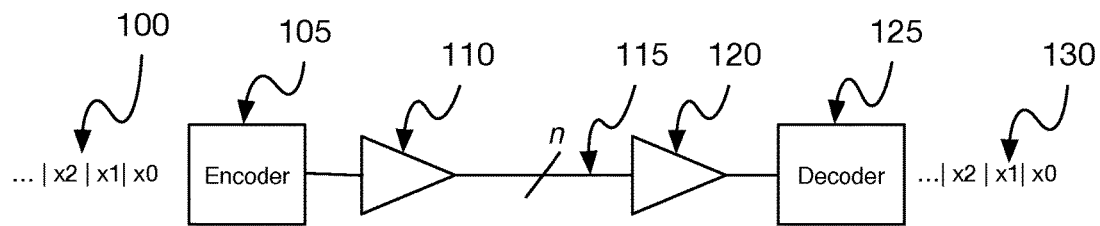
FIG. 1 illustrates a prior art communication system employing vector signaling codes.
Figure 13:
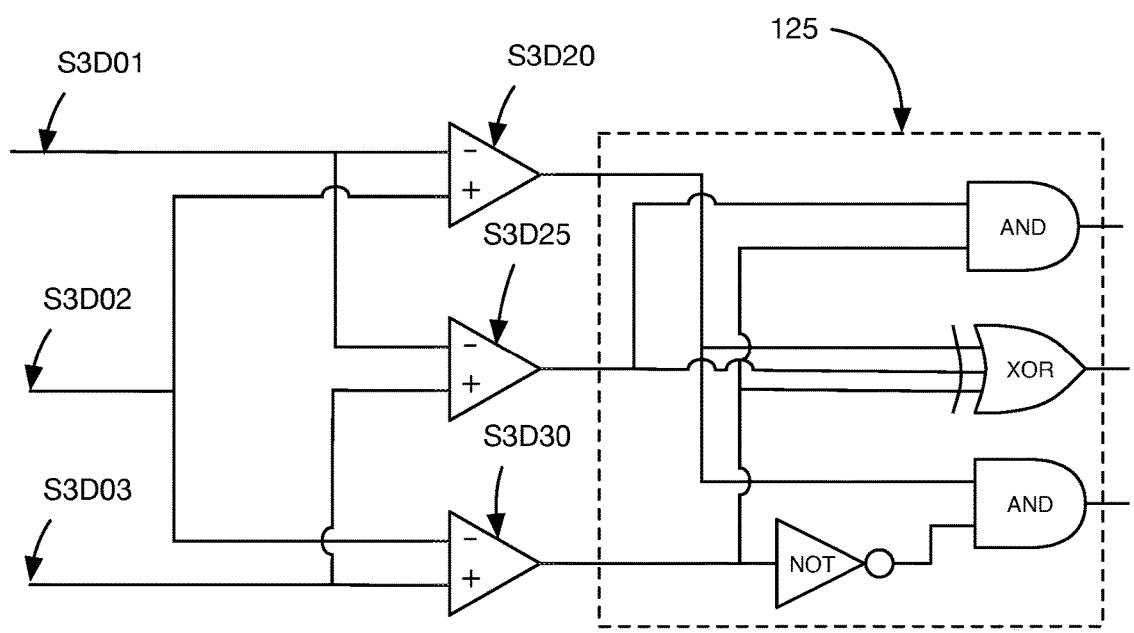
FIG. 13 is a block diagram of one embodiment of the receiver decoding portions of a S34 communications system.

An exemplary embodiment of decoder 125 of FIG. 1 for the case of S3 coding is given in FIG. 13. The three communication wires S3D01, S3D02, S3D03 enter a network of comparators S3D20, S3D25, and S3D30. In operation, S3D20 produces an output of "0" if the value on wire S3D01 is larger than the value on wire S3D02, and otherwise the output is 1. Similarly, the output of S3D25 is "0" if and only if the value on the wire S3D01 is larger than the value on wire S3D02, and the output of S3D30 is "0" if and only if the value on wire S3D02 is larger than the value on wires S3D03. Decoder 125 is a circuit that computes as its first output the value B&C, as its second output the value AˆBˆC, and on its third output the value A&(¬C), wherein A, B, and C are the outputs of units S3D20, S3D25, and S3D30, respectively.

The post-decoder units in this embodiment operate as described in FIG. 7. No explicit Global Decoder is required, as the bits output by the post-decoder units may simply be concatenated together to re-create the output bits 270 of FIG. 2.

The ISI ratio of this coding system is 2. This means that this coding system has a higher susceptibility to ISI noise than the ENRZ3 scheme. This communication system uses 12 signal wires, and 12 comparators. The wires have to be routed in 4 low-skew groups of 3 wires each.

Example 3: Code S42×P3

The S4 code is a vector signaling code on four wires consisting of the 12 distinct permutations of the vector (+1, 0, 0, −1). This code can be detected using six pairwise comparators. The ISI ratio of this code is 2.

The P3 code is a vector signaling code on three wires consisting of the four codewords (1, 0, −1), (−1, 0, 1), (0, 1, −1), and (0, −1, 1). The codewords can be detected using the comparators x-y and (x+y)/2-z on the received signals (x,y,z) on the three wires. The ISI ratio of this code is 1.

For the communication system in FIG. 2, we choose 3 communication sub-systems, i.e., k=3, wherein the first two communication sub-systems use the vector signaling code S4, and the third one uses the vector signaling code S3. We have M(1)=M(2)=12, and M(3)=4, so that the inequality of (Eqn. 3) is satisfied. The resulting code is called S43×P3.

The Global Encoder 205 of FIG. 2, and the Global Decoder 260 of FIG. 2 can operate according to the procedures in FIG. 5 and FIG. 8, respectively. The history pre-coding and post-decoding units 220 and 245 may also operate according to the procedures in FIG. 3 and FIG. 4, respectively.

Figure 14:
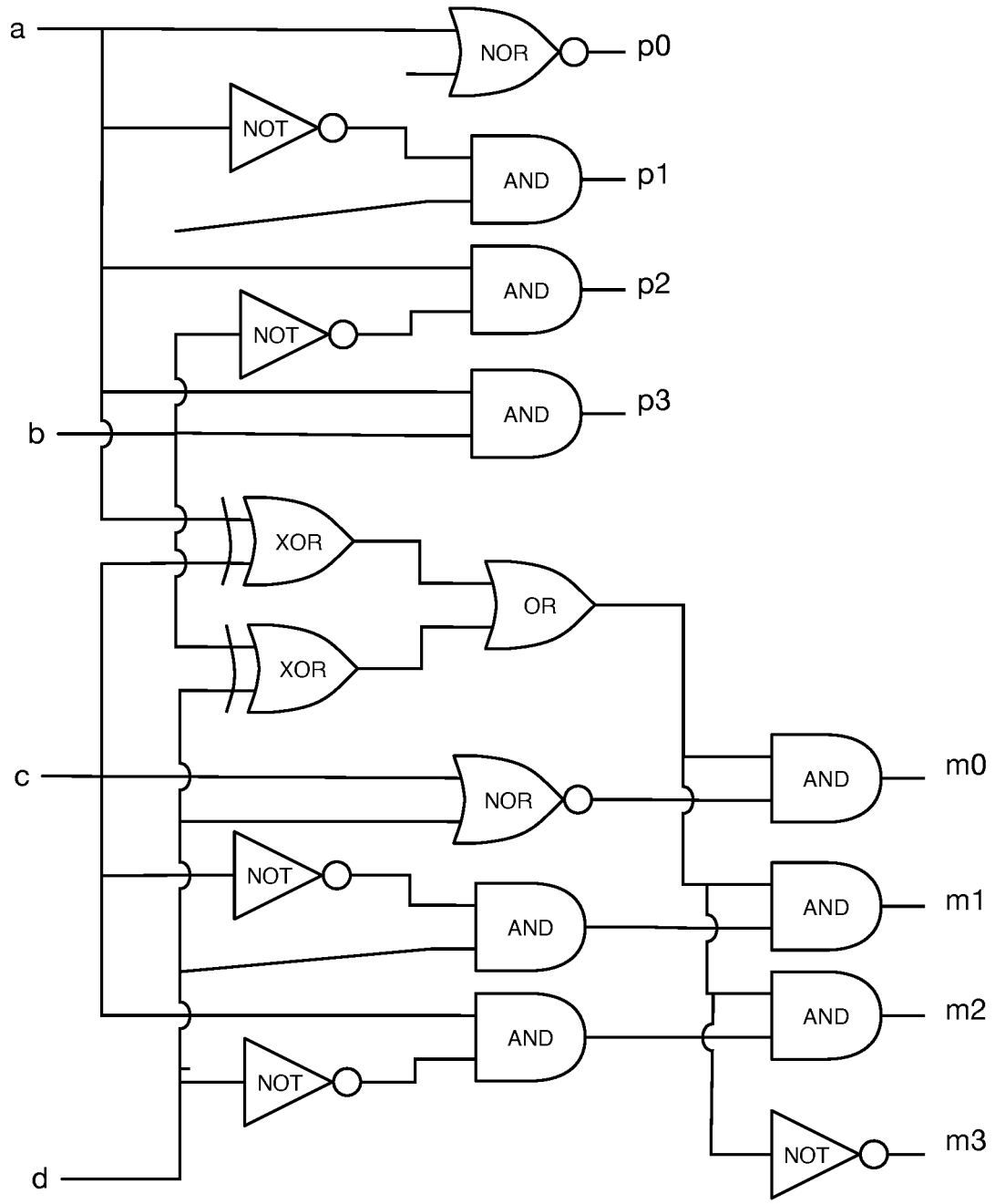
FIG. 14 shows one embodiment of an encoder for S4 vector signaling code.

One embodiment of an encoder for the S4 code is given in FIG. 14. The encoder produces two bit-vector (p0, p1, p2, p3) through the upper circuit and (m0, m1, m2, m3) through the lower circuit from inputs a, b, c, d representing an integer between 0 and 11 inclusive, wherein a is the least and d is the most significant bit of this integer. The bit sequence (p0, p1, p2, p3) is a mask for the position of the +1 in the corresponding codewords of S3, and (m0, m1, m2, m3) is a mask for the position of −1 in that codeword.

Figure 15:
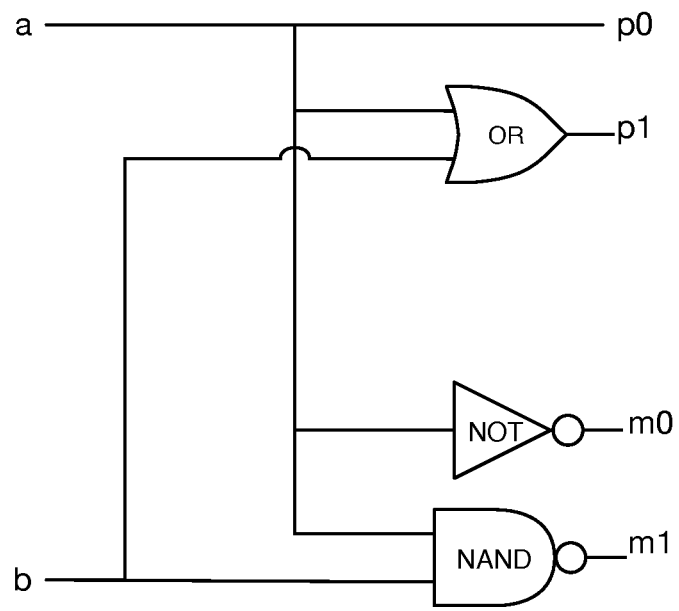
FIG. 15 shows one embodiment of an encoder for P3 vector signaling code.

One embodiment of an encoder for the code P3 is given in FIG. 15. Similar to the encoder for S4, this encoder produces two bit-vectors (p0, p1) and (m0, m1) from its inputs a and b. These vectors are masks for the positions of +1 and −1, respectively, in the corresponding codeword of P3.

These example embodiments are for illustrative purposes only. They can be further optimized using methods well-known to those of skill in the art.

The ISI ratio of this coding system is 2. This means that this coding system has a higher susceptibility to ISI noise than the ENRZ3 scheme, but a similar susceptibility to ISI noise as S34. This is confirmed by statistical simulation results reported below.

This communication system uses 11 signal wires, and 14 comparators. The wires have to be routed in 2 low-skew groups of 4 wires and one low-skew group of 3 wires each.

Example: OCT3

OCT is a vector signaling code on three wires consisting of the 8 codewords ((0.6, −1, 0.4), ((−0.2, −0.8, 1), ((−0.8, −0.2, 1), ((1, −0.6, −0.4). This code can be detected using four comparators x-y, (x+2*z)/3-y, (y+2*z)/3-x, (x+y)/2-1 on input (x,y,z) which represent the received values on the three wires of the interface. This code was first described in [Shokrollahi I].

For the communication system in FIG. 2, we choose 3 communication sub-systems, i.e., k=3, each using the vector signaling code OCT. We have M(1)=M(2)=M(3)=8, so that the inequality of (Eqn. 3) is satisfied. The resulting code is called OCT3.

In a first embodiment, Global Encoder 205 of FIG. 2 and the Global Decoder 260 of FIG. 2 operate according to the procedures in FIG. 5 and FIG. 8, respectively, and the history pre-coding and post-decoding units 220 and 245 operate according to the procedures in FIG. 3 and FIG. 4, respectively. In an alternative embodiment, pre-coding 220 and post-decoding 245 units operate according to the procedure outlined for ENRZ3 in FIG. 9 and FIG. 10, respectively.

The ISI ratio of this coding system is 8/3. This means that this coding system has a higher susceptibility to ISI noise all the previous systems. This is confirmed by statistical simulation results reported below. This communication system uses 9 signal wires, and 12 comparators. The wires have to be routed in 3 low-skew groups of 3 wires each.

Example: C182

The code C18 is a vector signaling code on four wires consisting of the 18 codewords (−1, ⅓, −⅓, 1), (−1, ⅓, 1, −⅓), (−1, 1, −⅓, ⅓), (−1, 1, ⅓, −⅓), (−⅓, 1, −1, ⅓), (−⅓, 1, ⅓, −1), (⅓, −1, −⅓, 1), (⅓, −1, 1, −⅓), (1, −1, −⅓, ⅓), (1, −1, ⅓, −⅓), (1, −⅓, −1, ⅓), (1, −⅓, ⅓, −1), (−1, −⅓, ⅓, 1), (−1, −⅓, 1, ⅓), (−⅓, ⅓, −1, 1), (−⅓, ⅓, 1, −1), (⅓, 1, −1, −⅓), (⅓, 1, −⅓, −1).

This code can be detected using five comparators x-z, x-u, y-z, y-u, z-u on input (x, y, z, u) which represent the received values on the four wires of the interface. This code was first disclosed in [Shokrollahi II].

For the communication system in FIG. 2, we choose 2 communication sub-systems, i.e., k=2, each using the vector signaling code C18. We have M(1)=M(2)=18, so that the inequality of (Eqn. 3) is satisfied. The resulting code is called $C18^2$.

This communication system can be made to work without a global encoder or a global decoder unit. The history pre-coding 220 and post-decoding 245 units may operate according to the procedures in FIG. 3 and FIG. 4, respectively.

The ISI ratio of this coding system is 3. This means that this coding system has a higher susceptibility to ISI noise all the previous systems. This is confirmed by statistical simulation results reported below. This communication system uses 8 signal wires, and 10 comparators. The wires have to be routed in 2 low-skew groups of 4 wires each.

Statistical Simulations

For the simulations below, the peak-to-peak voltage between the top and low levels was chosen to be 200 mV, and a channel model was used that is based on conventional communications channel characteristics for microstrips routed between integrated circuit devices. The only equalization used is a Tx FIR with one pre- and one post-cursor. The channel represents a realistic mobile DRAM channel, operating at a signaling rate of 7 GBaud/second, with the interfaces transmitting one full byte (plus mask) in every unit interval. The total throughput is therefore 56 Gbps.

Simulations were done with statistical eye program software proprietary to Kandou Bus, called "KEYS". For all the resulting eye diagrams the minimum horizontal and the minimum vertical eye openings as shown in Table I were recorded. Most of the time, these two minima don't occur within the same eye.

TABLE I

| | #wires | #comp. | ISI ratio | Max # wires in group | Minimal opening Horizontal | Vertical |
|---|---|---|---|---|---|---|
| $ENRZ^3$ | 12 | 9 | 1 | 4 | 92 psec | 83 mV |
| $S3^4$ | 12 | 12 | 2 | 3 | 50 psec | 35 mV |
| $S4^2 \times P3$ | 11 | 14 | 2 | 4 | 49 psec | 34 mV |
| $OCT^3$ | 9 | 12 | 2.667 | 3 | 16 psec | 2 mV |
| $C18^2$ | 8 | 10 | 3 | 4 | 7 psec | 1 mV |

As can be seen, and is to be expected, the minimal horizontal eye opening is a decreasing function of the ISI ratio. Higher crosstalk and lower margin further reduces the vertical opening for all codes other than ENRZ3.

Multi-Phase Embodiments

For each of the examples shown, an alternate embodiment exists that can be made to run faster through parallel implementation, often called a multi-phase implementation. In some embodiments, the positions of the encoder and pre-coder as shown in FIG. 3 may be more conveniently reversed to facilitate loop unrolling.

Figure 20:
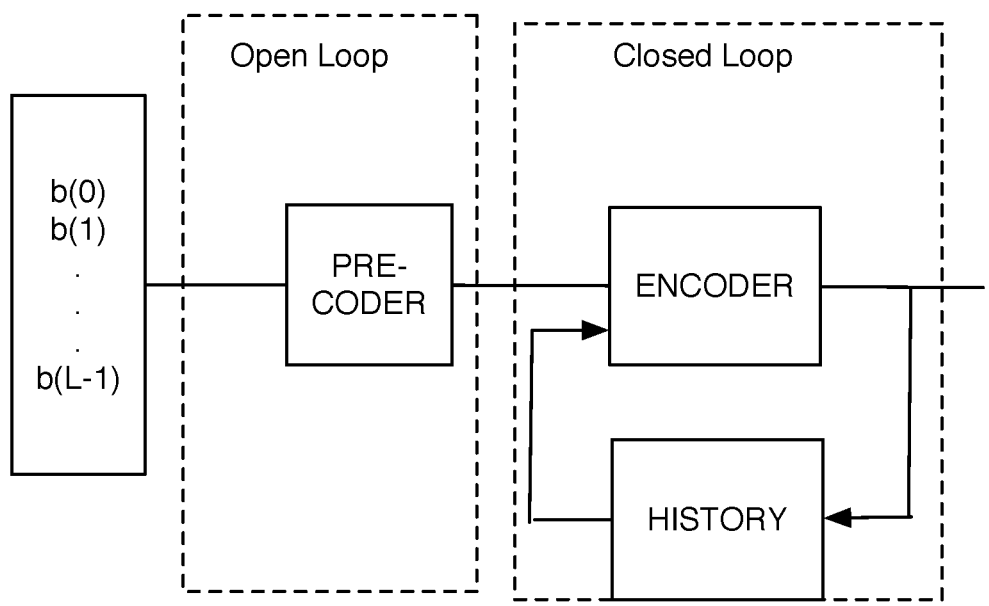
FIG. 20 is a block diagram of an encoder embodiment, highlighting its open- and closed-loop processing circuit portions.
Figure 22:
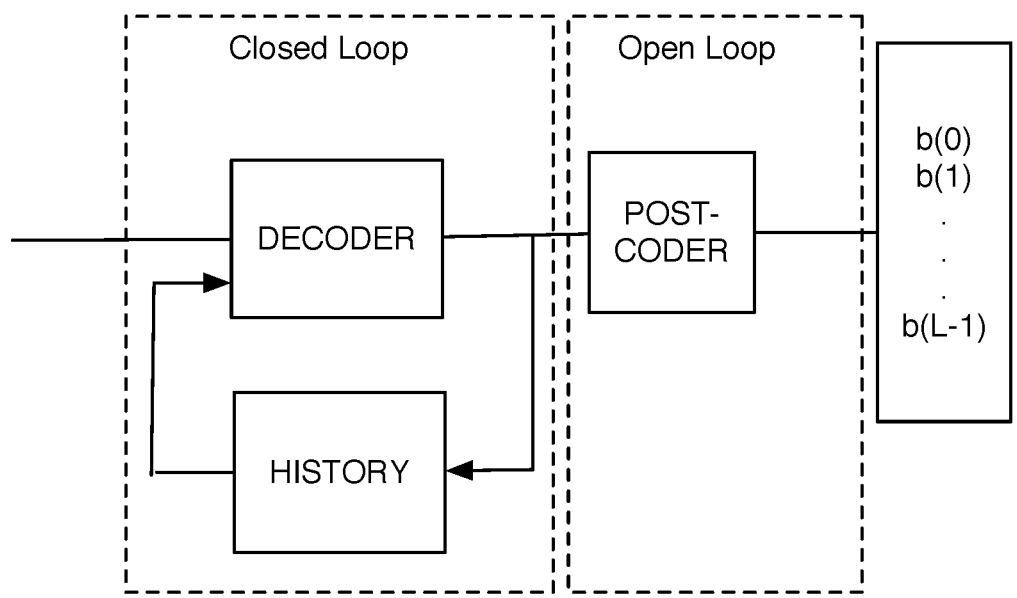
FIG. 22 is a block diagram of a decoder embodiment, highlighting the open- and closed-loop processing circuit portions.

In one embodiment, in which an example transmit encoding function is shown in FIG. 20 and an example receive decoding function is shown in FIG. 22, the coding functions are divided into open-loop and closed-loop portions. The goal of such a division is to make the closed-loop portion as small as possible in order to allow it to run at the highest speed possible. The closed loop portion works with historical information of what was sent on the line. In one embodiment, said closed-loop circuit works with the sample from the previous clock time. The open-loop portion of the circuit does not work on historical information from the line.

Figure 21:
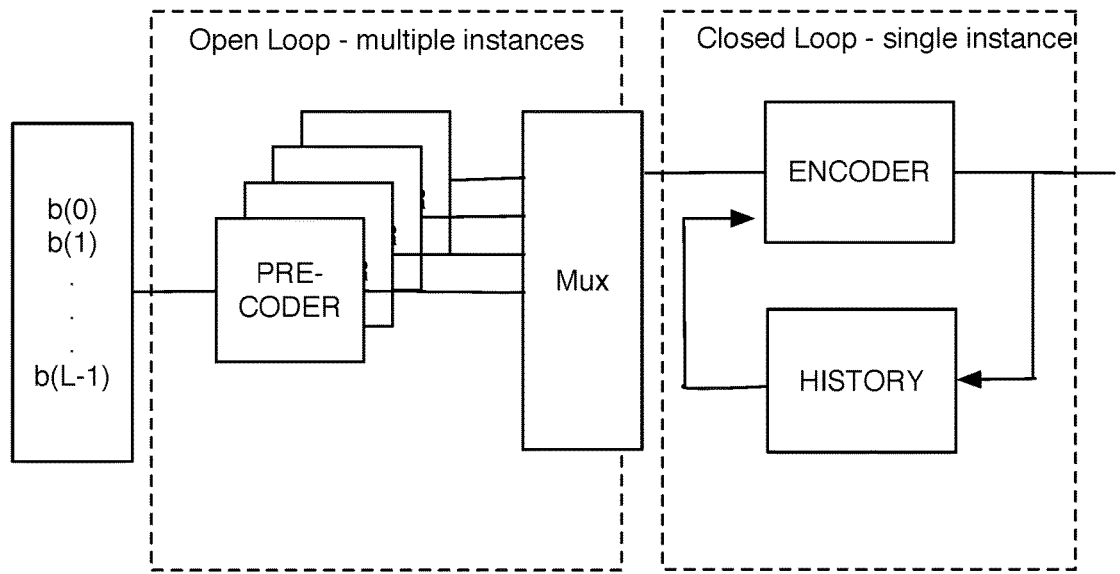
FIG. 21 is a block diagram of an encoder embodiment as in FIG. 20, where multiple instantiations of the open-loop portion of the circuit are implemented in parallel.
Figure 23:
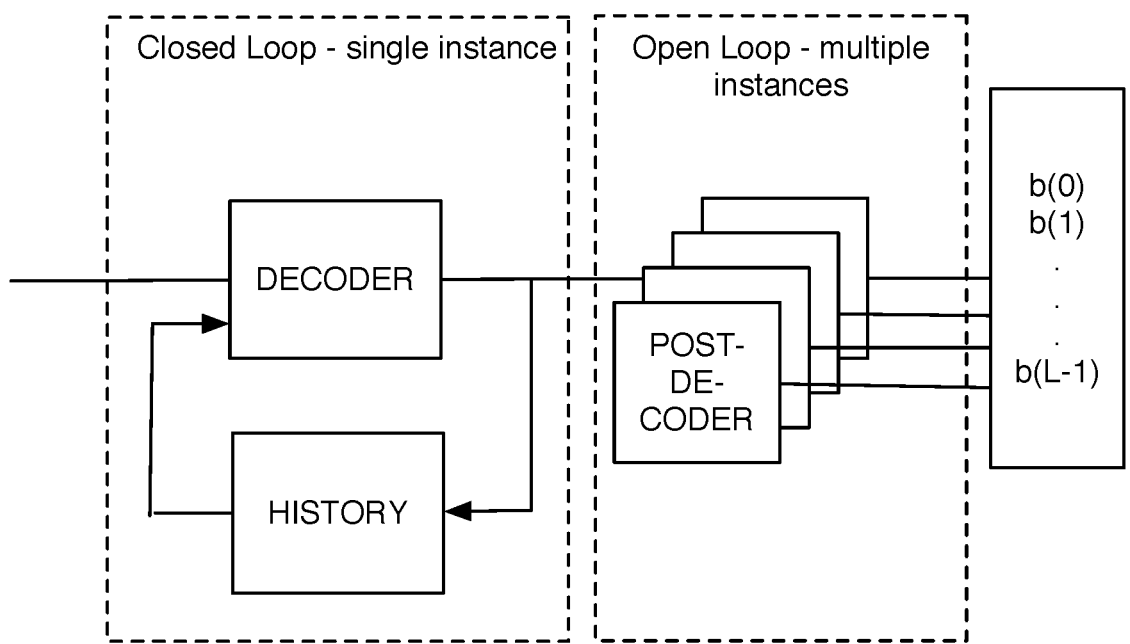
FIG. 23 is a block diagram of an encoder embodiment as in FIG. 22, where multiple instantiations of the open-loop portion of the circuit are implemented in parallel.

Because the open-loop portion of said circuit does not use historical information, an embodiment incorporating multiple instantiations of the circuit can be implemented in parallel, as illustrated in the example transmit encoding function shown in FIG. 21 and the example receive decoding function shown in FIG. 23. This is often referred to as a multi-phase circuit because the said parallel circuits are fed their inputs and produce their outputs offset in time from the other parallel circuits, e.g. in different circuit phases.

This parallel operation allows said open-loop encode circuit to have a markedly higher effective throughput. The outputs of said parallel circuits are then multiplexed back together into one output that said closed-loop encode circuit can operate on.

In the transmitter, the operation that said parallel open-loop encode circuit must perform is to break down the data input b(0) through b(L−1) into chunks that have M(K)−1 states.

The operation that said closed-loop encode circuit must perform is to compare the vector with the last vector that was sent. If said vectors are the same, the vector is replaced by the pre-defined repeat code.

In the receiver, the operation that said closed-loop decode circuit must perform is to compare the vector received with the repeat code. If said vectors are the same, said vector is then replaced by the vector that had been received immediately prior to the repeat code.

The operation that said parallel open-loop decode circuit must perform is to reassemble the vectors that have M(K)−1 states back into the data output of b(0) through b(L−1).

Generalized Open-Loop, Closed-Loop Operation

Said division of labor between the open-loop and closed-loop portions of the encoder and decoder circuits allows high speed implementations of vector signaling codes that modify the high frequency aspects of the interface. For example, embodiments utilizing the TL-3 and TL-4 codes of [Fox I] can be subdivided into their open-loop and closed-loop components and implemented at higher speed that would otherwise be possible. These two codes do not implement clock encoding, but rather lower the high-frequency spectral content of the vector signaling, thus reducing its power consumption.

Embodiments

In one transmitter embodiment, a transmitter comprises a global transmission encoder used for accepting input data to be partitioned across two or more sub-channels of a communications channel and generating a set of reduced-modulus sub-channel transmit data; a communications sub-systems for each of the two or more sub-channels, each comprising a data history pre-coder for accepting a respective one of the set of reduced-modulus sub-channel transmit data from the global transmission encoder and producing sub-channel transmit data based on the reduced modulus sub-channel transmit data and a prior codeword such that a signaling transition is provided by not retransmitting a given codeword in adjacent signaling intervals; a data encoder to encode the sub-channel transmit data into codewords of a vector signaling code; and a driver to produce physical signals representing the vector signaling code on the communications sub-channel.

In one such transmitter embodiment, the global transmission encoder performs a computation on the input data producing multiple results to be distributed among the two or more sub-channels.

In one such transmitter embodiment, each of the data coders maintains a history of at least one previous transmission interval to insure its sub-channel transmit data changes in each transmission interval.

In one such transmitter embodiment, the vector signaling code for each sub-channel is selected from a group consisting of: ENRZ, S3, OCT, C18, S4, and P3;

In one such transmitter embodiment, the vector signaling code for at least one sub-system is S4, and for at least one other sub-system is P3.

In one such transmitter embodiment, each of the data encoders maintains a history of at least one previous transmission interval to insure its transmit vector changes in each transmission interval. In a further such embodiment, the transmitter is implemented with parallel instantiations of the data history pre-coder.

In one receiver embodiment, a receiver comprises a circuit for receiving physical signals on a communications sub-channel; a data decoder for decoding the received signals representing a vector signaling code; a data post-decoder for accepting the decoded received signals and producing received sub-system data; a global decoder for accepting received sub-system data from each of the two or more communications sub-systems to be reconstituted into a received version of a set of input data.

In one such receiver embodiment, the timing of at least each communications sub-channel receiver is derived from signal transitions within its communications sub-channel.

In one such receiver embodiment, the global decoder performs a complementary computation on the received sub-system data to obtain the received version of the input data.

In one such receiver embodiment, each of the data post-decoders maintains a history of at least one previous reception interval to accurately produce its received sub-system data from the decoded received signals.

In one such receiver embodiment, the timing of at least one communications sub-channel receiver is derived from received signal transitions produced by the pre-coding of the corresponding sub-channel transmit data.

In one such receiver embodiment, the timing of the global decoder is obtained from the timing of at least one sub-channel receiver.

In once such receiver embodiment, each of the data decoders maintains a history of at least one previous reception interval to accurately deliver data to the post-decoder.

In one such receiver embodiment, the receiver is implemented with parallel instantiations of the post-decoder.

In once such receiver embodiment, the receiver further comprises a clock extraction circuit, wherein the clock extraction circuit further comprises one or more implementations from the group consisting of: analog hysteresis, decision feedback, digital decision feedback, offset comparators, analog XOR logic, per-codeword detector logic, and per-codeword flip-flops. In a further such embodiment, the outputs of the per-codeword flip-flops are combined together and passed through a delay line circuit. In a further such embodiment, the output of the delay line is used to clear the per-codeword flip-flops.

Figure 24:
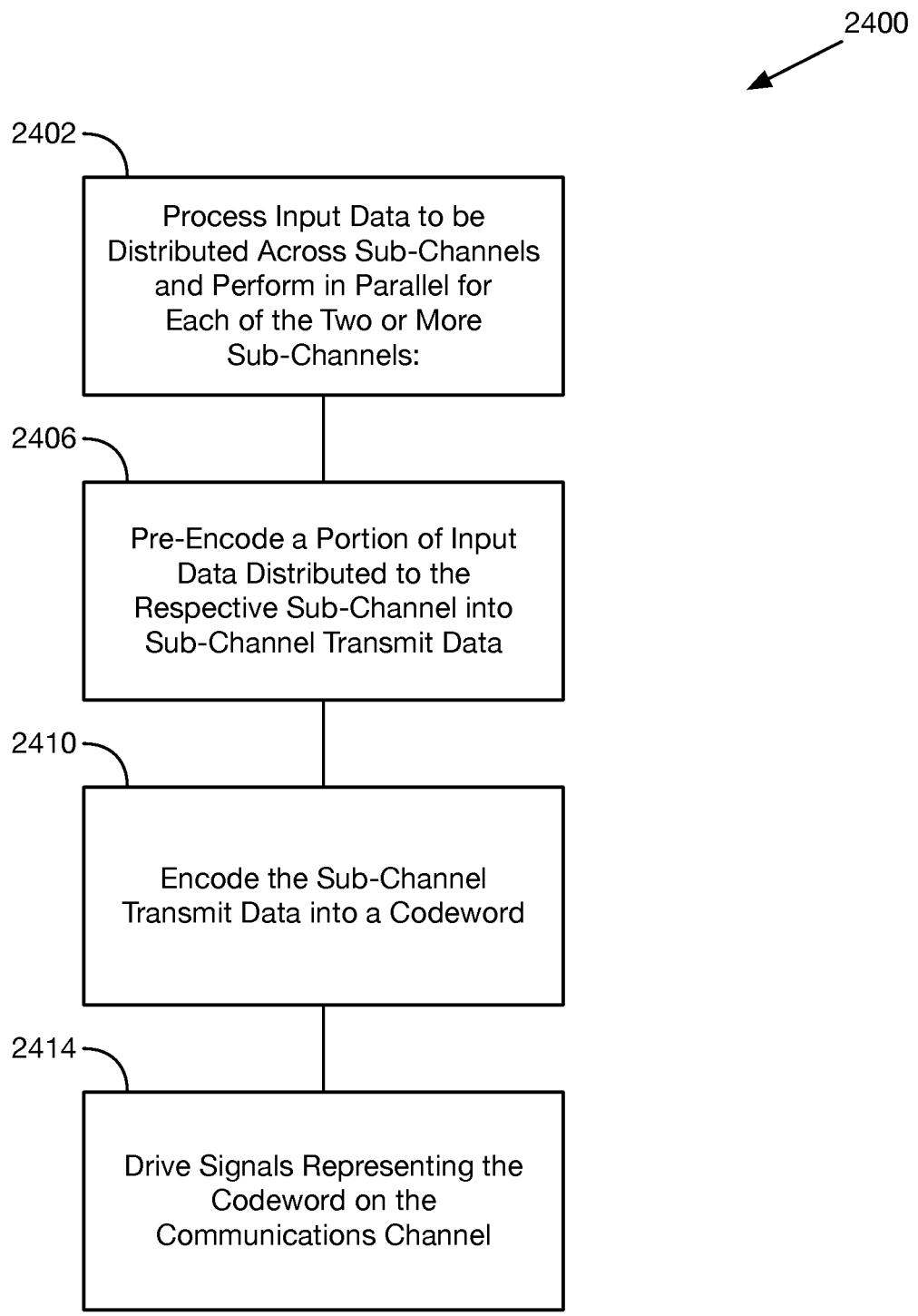
FIG. 24 is a flowchart of a transmission method.

In one embodiment, a method 2400 as depicted by FIG. 24 comprises: at block 2402, input data is processed and partitioned to be distributed across two or more sub-channels, each sub-channel comprising a plurality of signal lines; performing substantially in parallel for each of the two or more sub-channels: at block 2406 a portion of input data is pre-encoded and distributed to the respective sub-channel to produce sub-channel transmit data; at block 2410 the sub-channel transmit data is encoded into a codeword of a vector signaling code; and, at block 2414 physical signals are driven representing the codeword on the communications sub-channel.

Figure 25:
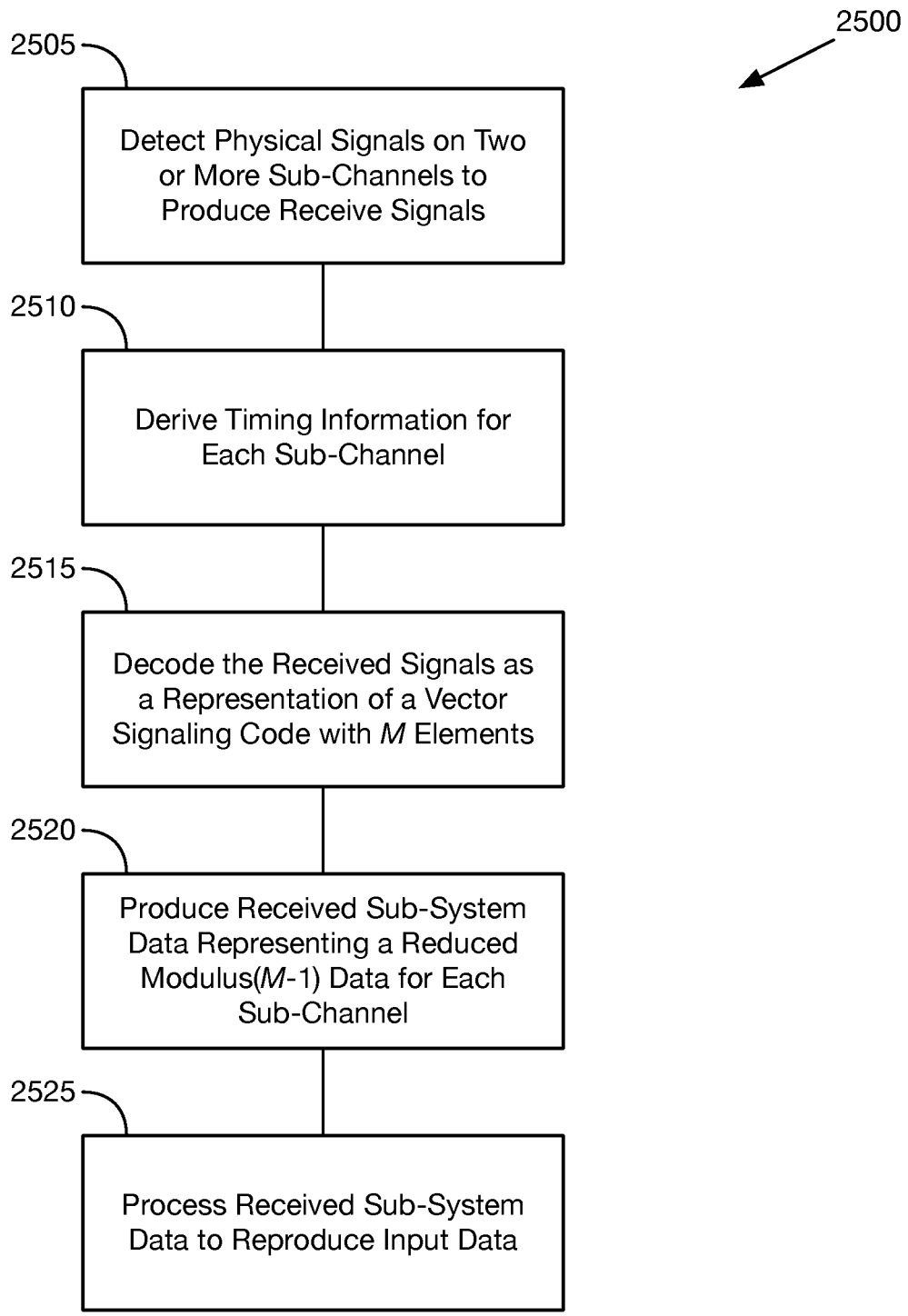
FIG. 25 is a flowchart of a reception method.

In one embodiment a method 2500 as depicted by FIG. 25 comprises: at block 2505 physical signals are detected on two or more communications sub-channels to produce received signals, each sub-channel comprising a plurality of signal lines; at block 2510, timing information is derived for each of the two or more communication sub-channels from the respective sub-channel encoded vector signaling code; for each of the two or more communications sub-channels, at block 2515 the received signals are decoded as a representation of a vector signaling code having M elements; at block 2520, received sub-system data is produced representing a reduce modulus (M−1) data for each of the two or more communications sub-channels; and, at block 2525 received sub-system data from each of the two or more sub-channels is processed to produce a received version of the input data output.

We claim:

1. An apparatus comprising:
   a global transmission encoder configured to accept input data and responsively generate a set of reduced-modulus data;
   a data history pre-coder configured to accept the set of reduced-modulus data from the global transmission encoder and to produce a set of transmit data based on a modulo addition of the set of reduced-modulus data with a codeword index associated with a codeword transmitted in a preceding unit interval such that the set of transmit data is different than the codeword index;
   a data encoder configured to encode the transmit data into symbols of a codeword of an orthogonal differential vector signaling (ODVS) code; and,
   a driver configured to transmit the symbols of the codeword via respective wires of a multi-wire bus.

2. The apparatus of claim 1, wherein the data history pre-coder comprises a storage element configured to store the codeword index associated with the codeword transmitted in the preceding unit interval.

3. The apparatus of claim 2, wherein the storage element comprises a flip-flop.

4. The apparatus of claim 1, wherein the ODVS code is selected from the group consisting of: Ensemble Non-Return to Zero (ENRZ), S3, OCT, C18, S4, and P3.

5. The apparatus of claim 4, wherein the multi-wire bus comprises a plurality of channels carrying symbols of respective codewords of respective ODVS codes.

6. The apparatus of claim 5, wherein at least two channels of the multi-wire bus carry different ODVS codes.

7. The apparatus of claim 1, wherein the ODVS code comprises a set of M codewords, and wherein the set of reduced-modulus data has a modulus of M−1.

8. The apparatus of claim 7, wherein the modulo addition has a modulus of M.

9. The apparatus of claim 1, further comprising a receiver comprising:
   a receive circuit configured to receive a set of signals via the multi-wire bus, the received set of signals corresponding to symbols of a received codeword of the ODVS code;
   a data decoder configured to generate a set of decoded signals by decoding the received set of signals;
   a data post-decoder configured to accept the set of decoded signals and to produce received data based on the set of decoded signals and a set of decoded signals decoded in a preceding unit interval; and,
   a global decoder configured to accept the received data to be reconstituted into a received version of a second set of input data.

10. The apparatus of claim 9, wherein the receiver further comprises a clock extraction circuit configured to derive a clock signal from a transition in the received set of signals with respect to a previously received set of signals received in the preceding unit interval.

11. A method comprising:
    receiving a set of input data and responsively generating a set of reduced-modulus data;
    generating a set of transmit data based on a modulo addition of the set of reduced-modulus data with a codeword index associated with a codeword transmitted in a preceding unit interval such that the set of transmit data is different than the codeword index;
    encoding the transmit data into symbols of a codeword of an orthogonal differential vector signaling (ODVS) code; and,
    transmitting the symbols of the codeword via respective wires of a multi-wire bus.

12. The method of claim 11, wherein the codeword index is stored in a storage element.

13. The method of claim 12, further comprising storing the transmit data in the storage element as a codeword index for generating transmit data in a subsequent unit interval.

14. The method of claim 11, wherein the ODVS code is selected from the group consisting of: Ensemble Non-Return to Zero (ENRZ), S3, OCT, C18, S4, and P3.

15. The method of claim 14, wherein the multi-wire bus comprises a plurality of channels carrying symbols of respective codewords of respective ODVS codes.

16. The method of claim 15, wherein at least two channels of the multi-wire bus carry different ODVS codes.

17. The method of claim 11, wherein the ODVS code comprises a set of M codewords, and wherein the set of reduced-modulus data has a modulus of M−1.

18. The method of claim 17, wherein the modulo addition has a modulus of M.

19. The method of claim 11, further comprising a receiver subsystem comprising:
    receive a set of signals via the multi-wire bus, the received set of signals corresponding to symbols of a received codeword of the ODVS code;
    generating a set of decoded signals by decoding the received set of signals;
    generating received data based on the set of decoded signals and a set of decoded signals decoded in a preceding unit interval; and,
    reconstituting the received data into a received version of a second set of input data.

20. The method of claim 19, further comprising deriving a clock signal from a transition in the received set of signals.

* * * * *